United States Patent
Coon

(10) Patent No.: US 9,951,531 B2
(45) Date of Patent: *Apr. 24, 2018

(54) SYSTEM AND METHOD FOR AN ADJUSTABLE CHANNEL FOR AN AIR CONDITIONING LINE SET

(71) Applicant: Stephen A. Coon, Windermere, FL (US)

(72) Inventor: Stephen A. Coon, Windermere, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/215,891

(22) Filed: Mar. 17, 2014

(65) Prior Publication Data

US 2014/0260069 A1    Sep. 18, 2014

Related U.S. Application Data

(60) Provisional application No. 61/800,688, filed on Mar. 15, 2013, provisional application No. 61/866,304, filed on Aug. 15, 2013.

(51) Int. Cl.
*E04F 17/08* (2006.01)
*F16L 3/26* (2006.01)
*F16L 9/22* (2006.01)
*H02G 3/04* (2006.01)

(52) U.S. Cl.
CPC ............... *E04F 17/08* (2013.01); *F16L 3/26* (2013.01); *F16L 9/22* (2013.01)

(58) Field of Classification Search
CPC ................................. H02G 3/0418; F16L 3/26
USPC ....................................................... 52/716.1
See application file for complete search history.

(56) References Cited

U.S. PATENT DOCUMENTS

| 2,039,886 A | | 5/1936 | Cohn | |
|---|---|---|---|---|
| 2,368,619 A | * | 2/1945 | Soderberg | H02G 3/0418 138/106 |
| 3,070,197 A | * | 12/1962 | Musselman | 52/656.4 |
| 3,118,017 A | * | 1/1964 | Hilton | H02G 3/0487 174/507 |
| 3,281,005 A | * | 10/1966 | Schumacher | H02G 3/0431 174/481 |
| 4,136,257 A | | 1/1979 | Taylor | |

(Continued)

FOREIGN PATENT DOCUMENTS

| DE | 3908330 C1 | * | 9/1990 | ............... H02B 1/21 |
|---|---|---|---|---|
| EP | 0579544 B1 | * | 4/1996 | ........... H02G 3/0418 |

(Continued)

*Primary Examiner* — Charles A Fox
*Assistant Examiner* — Joseph J. Sadlon
(74) *Attorney, Agent, or Firm* — Terry M. Sanks, Esq.; Beusse Wolter Sanks & Maire, PLLC

(57) ABSTRACT

A system is presented for covering a plurality of line sets with respective sizes. The system includes a first portion defining a plurality of slots formed along a sidewall of the first portion. The system also includes a second portion including a latch to extend from a sidewall of the second portion. The latch selectively engages one of the plurality of slots to secure the first and second portions with an opening therebetween of an adjustable size. The slot engaged by the latch is selected such the adjustable size of the opening corresponds to the respective size of the line set of the plurality of line sets to be covered by the system. A method is also presented for covering the plurality of line sets with respective sizes.

20 Claims, 19 Drawing Sheets

(56) References Cited

U.S. PATENT DOCUMENTS

| | | | |
|---|---|---|---|
| 4,404,779 A | 9/1983 | Calhoun et al. | |
| 4,517,777 A | 5/1985 | Calhoun | |
| 4,589,449 A | 5/1986 | Bramwell | |
| 4,602,124 A | 7/1986 | Santucci | |
| 4,907,767 A | 3/1990 | Corsi et al. | |
| 4,918,259 A * | 4/1990 | Hanson | 174/66 |
| 5,003,737 A | 4/1991 | Penczak | |
| 5,134,250 A * | 7/1992 | Caveney et al. | 174/101 |
| D331,916 S | 12/1992 | DuBrucq | |
| 5,206,972 A * | 5/1993 | Nudelmont | H02G 3/0418 16/108 |
| 5,219,403 A | 6/1993 | Murphy | |
| 5,243,800 A | 9/1993 | Olbrich | |
| 5,274,972 A | 1/1994 | Hensen | |
| 5,451,278 A | 9/1995 | Nolf | |
| 5,523,529 A | 6/1996 | Holliday | |
| 5,792,992 A | 8/1998 | Handler | |
| 5,802,672 A * | 9/1998 | Rohder | H02G 3/0418 16/95 R |
| 5,949,025 A | 9/1999 | Nagai et al. | |
| 6,367,211 B1 * | 4/2002 | Weener | H02G 3/383 138/120 |
| D474,750 S * | 5/2003 | Dyer | D13/155 |
| 6,803,519 B2 | 10/2004 | de la Borbolla et al. | |
| 6,972,367 B2 * | 12/2005 | Federspiel | H02G 3/0418 174/481 |
| 6,998,530 B2 * | 2/2006 | Snyder | 174/483 |
| 7,385,148 B2 * | 6/2008 | Picard | H02G 3/00 174/481 |
| 7,770,341 B2 * | 8/2010 | Fox | H02G 3/32 138/107 |
| 8,161,705 B2 * | 4/2012 | Pratt | 52/506.05 |
| 8,291,658 B1 * | 10/2012 | Johnston | E04D 13/1471 285/42 |
| 8,616,921 B2 * | 12/2013 | Byrne | H01R 25/00 439/214 |
| 8,704,093 B2 * | 4/2014 | Asztalos | H02G 3/0418 138/155 |
| 8,898,974 B1 * | 12/2014 | Gardner | H02G 3/22 174/68.1 |
| 2005/0126094 A1 * | 6/2005 | Shimizu | F16L 3/26 52/220.1 |
| 2009/0019802 A1 | 1/2009 | Crall | |
| 2009/0321586 A1 * | 12/2009 | Kabat | F16L 3/23 248/49 |

FOREIGN PATENT DOCUMENTS

| | | | |
|---|---|---|---|
| EP | 1271733 A1 | 1/2003 | |
| EP | 1284535 A1 * | 2/2003 | H02G 3/04 |
| GB | 1604016 A * | 12/1981 | F16L 3/26 |
| GB | 2278739 A * | 12/1994 | H02G 3/0418 |
| GB | 2473343 B * | 12/2011 | H02G 3/0418 |
| WO | WO 9810500 A1 * | 3/1998 | B29C 47/003 |
| WO | WO 2006136412 A1 * | 12/2006 | E04F 15/02 |
| WO | 2011005371 | 1/2011 | |

* cited by examiner

SYSTEM AND METHOD FOR AN ADJUSTABLE CHANNEL FOR AN AIR CONDITIONING LINE SET

CROSS-REFERENCE TO RELATED APPLICATIONS

This application claims the benefit of U.S. Provisional Patent Application No. 61/800,688 filed on Mar. 15, 2013, and U.S. Provisional Patent Application No. 61/866,304 filed on Aug. 15, 2013, both of which are incorporated by reference herein.

BACKGROUND

Embodiments relate to a cover system and, more particularly, to a channel system for covering air conditioning line sets.

Currently, to cool a house or a commercial building, a minimum number of cooling units, such as air conditioning units or evaporative coolers (swamp coolers), may be utilized. However, the use of a minimum number of cooling units may not be economically beneficial. Depending on the placement of a thermostat within the residence and heating patterns dependent on exterior shading on the house, the cooling system may be forced to operate longer and for more frequent durations than needed. In a non-limiting example, if a thermostat is located in a hallway on a first end of the residence, and the primary room used in the residence is a family room located at a second end of the residence, the cooling system will operate for a longer time period than needed.

A more economical solution for cooling a residence or building is by providing a plurality of cooling units designated to cool a particular room or part of the residence. Such localized cooling units will each have its own individual line sets. More specifically, lines run from a condenser unit in the cooling system to a blower unit within the particular room or part of the residence. As the use of these individual cooling units increase, the need for providing covers for their line sets has also increased, to seamlessly integrate these additional line sets along the exterior of the residence or building. Additionally, pre-existing air conditioning units routinely require replacement of their individual line sets, to accommodate new types of refrigerant required by various industrial standards.

However, an issue with the conventional line set covers is that manufacturers provide them in fixed sizes, with several distinct sizes, and thus each fixed size cover is only sized to fit line sets for a particular individual cooling unit. Installers of such cooling systems must stock their vehicles with various sizes of ducts to accommodate an unknown size needed for a particular individual cooling system at an installation site. Furthermore, since these ducts also require T-shape connectors, bends, elbows, etc., various sizes of each of these cover connector elements must also be constantly stocked.

SUMMARY

A system and method for covering a plurality of line sets having a plurality of respective sizes are disclosed. The system comprises at least one duct comprising a first portion defining a plurality of receiving members formed along a sidewall of the first portion and a second portion including an engaging member extending from a sidewall of the second portion, said engaging member being configured to selectively engage one receiving member of the plurality of receiving members to secure the first and second portions together with an opening of an adjustable size therebetween, wherein the receiving member selectively engaged by the engaging member is selected such that the adjustable size of the opening corresponds to the respective size of one of the plurality of line sets to be covered by the system, and wherein the plurality of receiving members are spaced apart along the sidewall such that a range of sizes of the opening upon engagement of the engaging member with the plurality of receiving members is sufficient to accommodate a range of the respective sizes of the line sets for the air conditioning systems. The system also comprises a connector configured to attach to an end of the duct, the connector having a first connector portion with an exterior surface defining a hole, a second connector portion including a housing defining a hole, and a fastener configured to pass through the hole in the exterior surface and the hole in the housing to secure the first and second connector portions together with an opening of an adjustable size therebetween corresponding to a respective size of the at least one duct.

Another system comprises a first portion defining a plurality of receiving members formed along a sidewall of the first portion and a second portion including an engaging member extending from a sidewall of the second portion, said engaging member being configured to selectively engage one receiving member of the plurality of receiving members to secure the first and second portions together with an opening of an adjustable size therebetween. The receiving member selectively engaged by the engaging member is selected such the adjustable size of the opening corresponds to the respective size of one of the plurality of line sets to be covered by the system. The plurality of receiving members are spaced apart along the sidewall such that a range of sizes of the opening upon engagement of the engaging member with the plurality of receiving members is sufficient to accommodate a range of the respective sizes of the line sets for the air conditioning systems.

The method comprises providing a first portion with a plurality of slots formed along a sidewall of the first portion and providing a second portion with a latch extending from a sidewall of the second portion. The method also comprises pressing the first portion and the second portion together, including selectively engaging one slot of the plurality of slots with the latch and securing the first and second portions together with an adjustable opening therebetween corresponding to the respective size of the line set to be covered.

BRIEF DESCRIPTION OF THE DRAWINGS

A more particular description will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
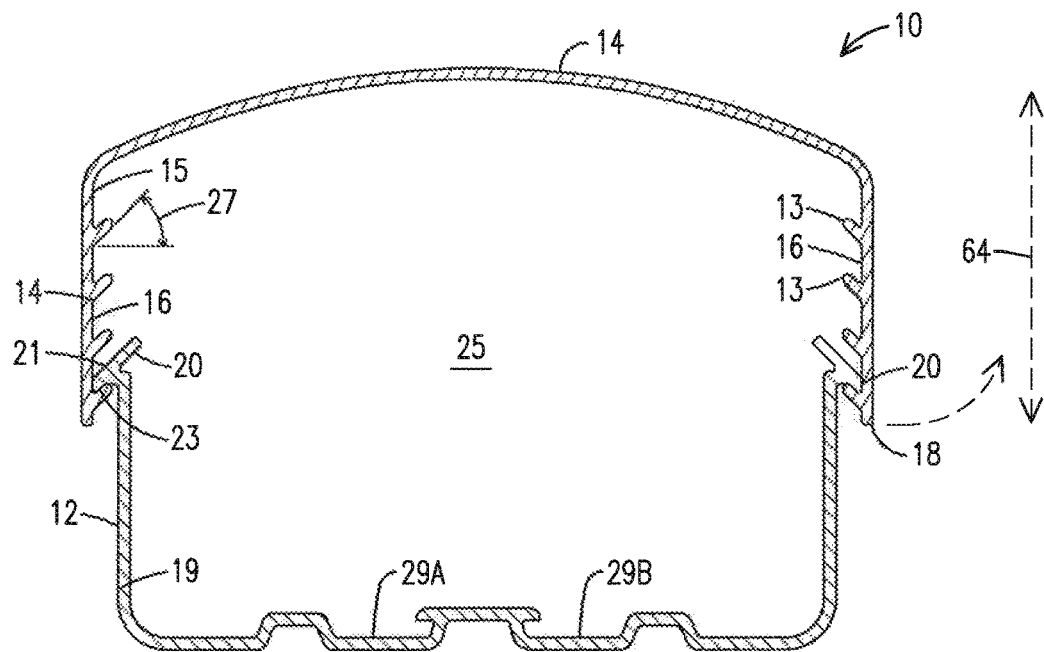
FIG. 1 shows a cross sectional view of one embodiment of a duct of an adjustable channel system at a first separation.

Embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The disclosed embodiments are not limited by the illustrated ordering of acts or events, as some acts may occur in different orders and/or concurrently with other acts or events. Furthermore, not all illustrated, acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. As a non-limiting example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 6.

Though the embodiments herein specifically disclose an adjustable channel system fir air conditioning line sets, embodiment may be used for other devices or systems with an enclosed fixture which minimizes exposure to moisture and may be formed and disassembled with minimum use of tools. The air conditioning line sets may include copper tubing inside foam that contains and delivers Freon to and from components within an air conditioning system. The embodiments may also be used with electrical cables and condensation lines (i.e. water drain pipes). Therefore, the discussion of air conditioning units and air conditioning line sets should not be considered limiting when explaining the embodiments herein. Additionally, although the adjustable channel system may be used with air conditioning units that are used to cool a residence, they may also be used with any air conditioning units, including those that are used to cool any house or commercial building, in a now-limiting example.

The inventor recognized that a downside of conventional line set covers is that they are provided in fixed sizes, and thus each fixed size cover is sized to fit line sets for a particular individual cooling unit. Additionally, the inventor recognized that conventional line set covers require installers to stock their vehicles with multiple line covers of each size, to accommodate an unknown duct size at an installation site for a particular individual cooling system. Thus, the inventor advantageously recognized that owners of individual cooling systems and installers of such cooling systems would benefit from a single adjustable channel system which may be used universally across all styles and brands of individual cooling systems. As discussed below, the adjustable channel system may include ducts and parts, where the ducts are straight sections of the adjustable channel system and the parts are angled, curved or inlet/outlet sections of the adjustable channels system.

Figure 32:
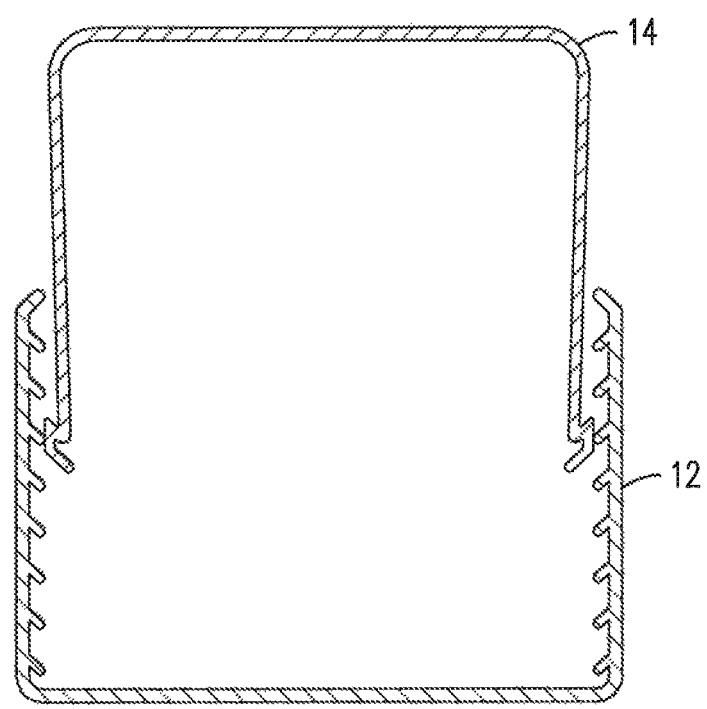
FIG. 32 shows another embodiment of a cross section view of the duct and the adjustable channel system partially separated.

FIG. 1 shows a cross section view of a duct of an adjustable channel system. The duct 10 of the adjustable channel system 5 may include a lower half 12 and an upper half 14. In an embodiment, the lower and upper halves 12, 14 may be made from plastic material, such as polyvinyl chloride (PVC) plastic or polypropylene plastic (PP), in an non-limiting example. However, the lower and upper halves 12, 14 may be made from any type of material which accommodates the coverage of the line sets, as discussed herein. The upper half 14 may have a larger width than the lower half 12 such that the lower half 12 fits within the upper half 14. In another embodiment, as shown in FIG. 32, the upper half may have a smaller width than the lower half such that the upper half is configured to fit within a lower half 12. However, the illustrated version of FIG. 1 is preferred since this configuration prevents or minimizes water, such as, but not limited to, rain water or sprinkler water from sitting on a region where the halves 12, 14 meet and eventually seeping into the opening 25 between the two halves 12, 14.

As further illustrated in FIG. 1, a plurality of slots 16 may be provided on an inner sidewall 15 of the upper half 14, where each slot 16 is defined between a pair of adjacent teeth 13 that extend inward from the inner sidewall 15 at an angle 27 with respect to the inner sidewall 15. Although four slots 16 are depicted in FIG. 1, this is merely one non-limiting example and the upper half 14 may include less or more than four slots along the inner sidewall 15 of the upper half 14. In an embodiment, the angle 27 is approximately 45 degrees, however the angle 27 may be within a range of 30-60 degrees, in an non-limiting example. In an embodiment, the teeth 13 may have a length of approximately 3.5 mm and may be in a range of 2-5 mm extending from the inner sidewall 15. However, neither the angle 27 nor the length of the teeth 13 are limited to any specific dimension or range of dimensions. Additionally, the teeth 13 may extend from the inner sidewall 15 over the longitudinal length of the upper half 12, or may extend from the inner sidewall 15 over a portion of the longitudinal length of the upper half 12. The teeth 13 and slots 16 are not limited to any particular length or angular orientation along the inner sidewall and the above ranges of the length and angle of the teeth 13 and slots 16 are merely one non-limiting example.

The slots 16 of the upper half 14 may be configured to mate with the lower half 12 of the system 5. As illustrated in FIG. 1, a tab 18 may also be provided on the upper half 14. The tab 18 may be an extension of the inner sidewall 15, beyond a lowest slot 16 of the upper half 14. In an embodiment, the tab 18 extends beyond the lowest slot 16 by a length of approximately 2.4 millimeters (mm) or within a range of 2-4 mm, in a non-limiting example. However, the tab 18 is not limited to any specific length. The tab 18 may be provided so that an installer may pull the tab 18 in a direction away from the lower half 12 to separate the two halves 12, 14 and/or to adjust an amount of area within the opening 25 between the two halves 1.2, 14. In an non-limiting example, if the installer wishes to reduce the area between the two halves 12, 14, the installer would first pull the tab 18 in the direction away from the lower half 12, to separate the two halves 12, 14, after which the installer would push the lower half 12 upwards into the upper half 14 until a desired separation 64 is between the two halves 12, 14 and the appropriate slot 16 of the upper half 14 engages the lower half 12 and the desired area between the two halves 12, 14 is achieved. Since the installer may vary the area between the two halves 12, 14 by simply pulling the tab 18, and adjusting the separation 64 of the halves 12, 14, separating the halves 12, 14 may be accomplished with minimum use of a tool.

As further illustrated in FIG. 1, the upper half 14 may have a top surface 17 which is arcuate from a first sidewall 15 to a second sidewall 15 of the upper half 14. In an embodiment the top surface 17 may have a radius of curvature of 131.5 mm or within a range of 100-150 mm. However, the radius of curvature of the top surface 17 is not limited to any numeric value or range of numeric values. The top surface 17 may be arcuate, in order to provide additional area within the opening 25 to position lead lines. However, as discussed below, the embodiments are not limited to the upper half having an arcuate top surface and the upper half may instead have a top surface which is orthogonal to the inner sidewall 15 of the upper half 14, in an non-limiting example. In an embodiment, the upper half 14 may have any length, such as, but not limited to, within a range of 1 meter to 1.5 meters, in a non-limiting example, a height in a range of 90-100 mm, in a non-limiting example, and a thickness in a range of 1-3 mm, in a non-limiting example. The lower half 12 may have a length and a height that are designed within similar ranges as those of the upper half 14 disclosed above. However, the upper and lower halves are not limited to these specific numerical dimensions and may be sized with any specific dimensions, provided that the upper and lower halves are capable of providing an adjustable area therebetween.

As further illustrated in FIG. 1, the lower half 12 may have a latch 20 that is an extension of an inner sidewall 19 of the lower half 12 and is configured to engage the slots 16. As illustrated in FIG. 1, the latch 20 may include a first segment 21 and a second segment 23, where the first segment 21 is configured to engage an upper tooth 13 of the slot 16 and the second segment 23 is configured to engage a lower tooth 13 of the slot 16. As illustrated in FIG. 1, the first segment 21 may have a length which exceeds a length of the teeth 13. Additionally, as illustrated in FIG. 1, the width of the latch 20, defined as a width between the first segment 21 and the second segment 23 is such that the latch 20 fits within the slots 16 where additional space or gapping between the latch 20 and the respective engaged slot 16 is at a minimum, to reduce an opening between the latch 20 and the slot 16 through which moisture may penetrate into the opening 25 between the two halves 12, 14. Although FIG. 1 depicts that the system 10 includes the lower half 12 and the upper half 14 secured together, the embodiments are not limited to two halves of a system being secured together and may include a system with more than two portions, where a first and a second portion of the system are secured together. Additionally, although FIG. 1 depicts that the lower half 12 and the upper half 14 are secured together with the latch 20 of the lower half 12 being secured in a slot 16 of the upper half 14, the embodiments are not limited to this structural arrangement and include any type of fastening arrangement in which a plurality of receiving members, or slots 16, are arranged along the inner sidewall of at least one of a first portion and a second portion with at least one engaging member arranged on at least the first portion or second portion, whichever does not have the receiving members, which together are used to selectively engage to adjust the size of the opening therebetween the first portion and the second portion, to accommodate a line set of a particular size. In a non-limiting example of the upper half having a width that is less than the lower half, the slots would be formed along an outer sidewall of the upper half and the latch of the lower half would extend inward from the sidewall of the lower half, to selectively engage one slot of the plurality of slots.

Figure 2:
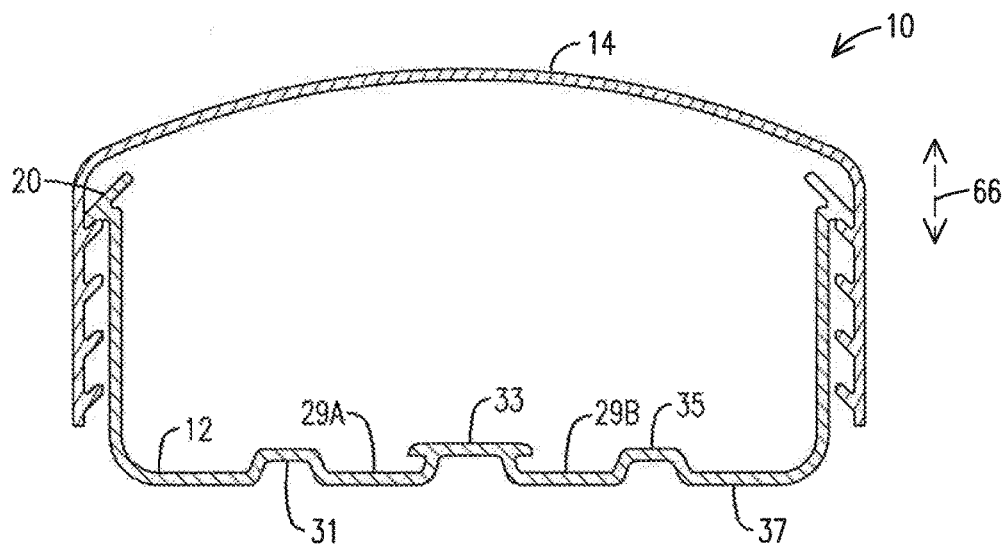
FIG. 2 shows a cross sectional view of the duct of the adjustable channel system of FIG. 1 at a second separation.

FIG. 2 shows a cross sectional view of a duct 10 of the adjustable channel system 5 adjusted from the first separation 64 (FIG. 1) between the upper and lower halves 12, 14 to a second separation 66 less than the first separation 64 between the upper and lower halves 12, 14. In FIG. 1, the latch 20 of the lower half 12 engages a first slot 16 resulting in the first separation 64 between the halves 12, 14 and the opening 25 between the halves 12, 14 has a maximum size to accommodate a large size or large quantity of lines, in a non-limiting example. In FIG. 2, the top half 14 has been pressed onto the lower half 12 until the latch 20 engages the last slot 16, resulting in the second separation 66 between the halves 12, 14 and the opening 25 between the upper and lower halves 12, 14 having a minimum size to accommodate a small size or small quantity of lines, in a non-limiting example.

FIG. 2 further illustrates that the lower half 12 may define a pair of grooves 29A, 29B defined by a plurality of rail members 31, 33, 35 extending along a bottom portion 37 of the lower half 12. As discussed in greater detail below, the grooves 29A, 29B may be sized to receive hooks from a clip, which securely holds one or more line sets to the bottom portion 37 of the lower half 12.

Figure 3:
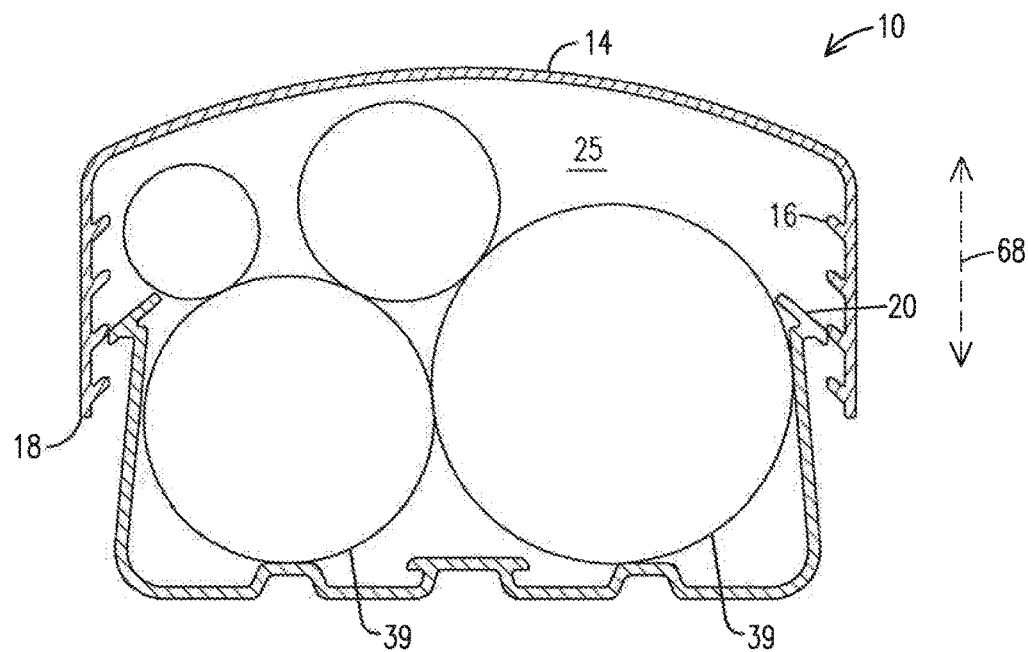
FIG. 3 shows a cross sectional view of the duct of the adjustable channel system of FIGS. 1-2 with line sets inside.

FIG. 3 illustrates an embodiment in which the latch 20 of the lower half 12 engages a slot 16 between the first slot 16 (FIG. 1) and the last slot 16 (FIG. 2), resulting in a separation 68 between the upper and lower halves 12, 14 that is between the first separation 64 and the second separation 66. As a result, the opening 25 between the upper and lower halves 12, 14 may have a size between the maximum size (FIG. 1) and the minimum size (FIG. 2). The lower half 12 is pressed up into the upper half 14 until the latch 20 engages the slot 16 along the inner sidewall 15. In a non-limiting embodiment, the installer chooses the separation 68 and appropriate slot 16 to engage the latch 20, such that the opening 25 is sufficient to receive the lead lines 39. In another non-limiting embodiment, the installer installs the lower half 12 first. The installer then installs the line set or lead lines 39 within the lower half 12. The installer next presses the upper half 14 onto the lower half 12 where there is a separation between the upper and lower halves 12, 14 which provides for securing the lead lines 39 within.

By having the top half 14 fit around an outside of the lower half 12, damage to the lead lines 39 is prevented and/or minimized, such damage attributable to moisture initiated by sprinkler water or rain water passing into the opening 25, which may have a higher probability if the top half were sized to fit inside the lower half, in a non-limiting example.

Since placement of the ducts 10 with respect to a direction of the lines for the air conditioning unit may run along an outside of a building, joints or connectors and components to provide for turning the path the ducts 10 may take are needed. In an embodiment, these joints or connectors are configured to work with the ducts 10 disclosed herein. These joints or connectors are provided to allow for ease of removing at least an upper half of the joint when access to the channel within the duct 10 is desired.

Figure 4:
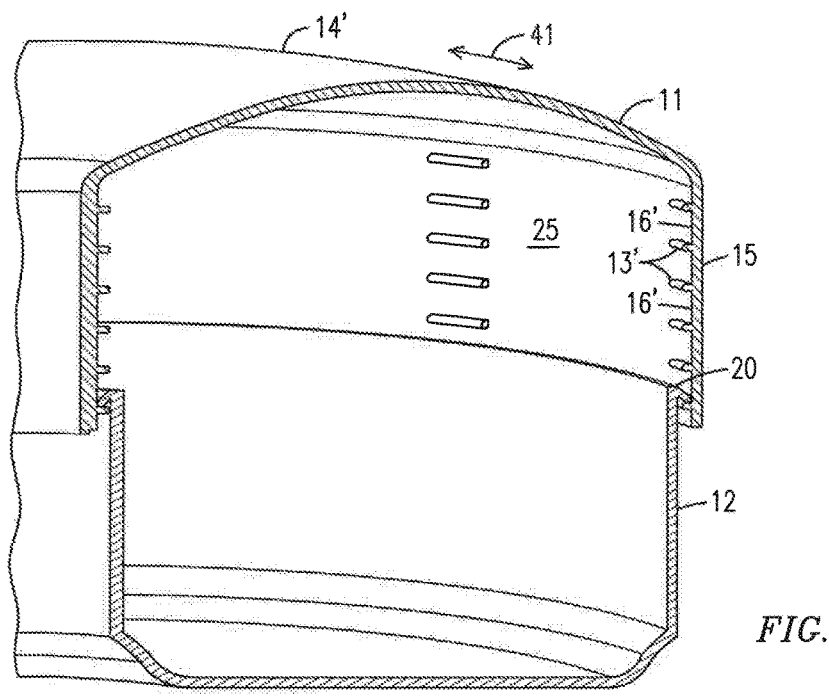
FIG. 4 shows a cross sectional view of an elbow of an alternate embodiment of the adjustable channel system.

FIG. 4 shows a cross sectional view of a part of an embodiment of an elbow 11 which may be used to connect two ducts 10 and provide for changing a direction path ducts 10 used together. As illustrated in FIG. 4, the upper half 14 of the elbow 11 may include teeth 13' and slots 16' that extend along the inner sidewall 15 over a portion 41 of the longitudinal length of the upper half 14'. Although FIG. 4 illustrates an elbow channel. upper half 14' with spaced apart slots 16' positioned along the portion 41 of the length of the upper half 14', the spaced apart slots may similarly be positioned along portions of the length of straight, curved, and bent connectors.

Likewise with respect to the ducts 10 illustrated in FIGS. 1-3, the slots 16 do not have to be continuous along the inner wall. Instead, a plurality of slots 16 may be located along a same longitude and spaced apart from each other. Thus, of the straight or curved connectors of the system 5 may have slots which extend continuously along the length of the connector or extend over a portion of the length of the connector.

Turning back to FIG. 4, in an embodiment, the portions 41 of the length of the upper half 14' may be approximately 18 mm in length, in one non-limiting example. As further illustrated in FIG. 4, the lower half 12 includes the latch 20 which is sized to be received within the spaced-apart slots 16' along the inner sidewall 15 of the upper half 14'. However, the embodiment of FIG. 4 does not limit the embodiments of an elbow, joint or connector as discussed further herein.

Figure 5:
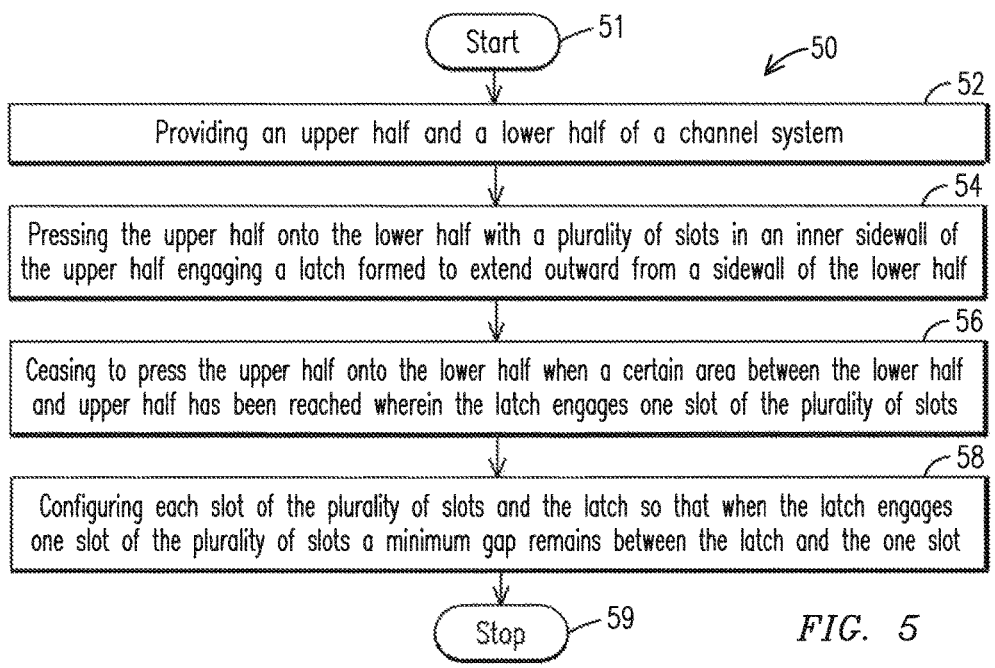
FIG. 5 shows a flowchart illustrating an embodiment of a method for providing an adjustable channel for a line set.

FIG. 5 shows a flowchart illustrating an embodiment of a method 50 for providing the adjustable channel system 10 for an air conditioning line set. The method 50 may begin at 51 with the step of providing 52 the upper half 14 and the lower half 12 of the channel system 10. The method 50 may further include the step of pressing 54 the upper half 14 onto the lower half 12 with a plurality of slots 16 along an inner sidewall 15 of the upper half 14 engaging a latch 20 formed to extend outward from the inner sidewall 19 of the lower half 12. The method 50 may further include the step of ceasing 56 to press the upper half 14 onto the lower half 12 when a certain area between the lower half and upper half 12, 14 has been reached wherein the latch 20 engages one slot 16 of the plurality of slots. The method 50 may further include the step of configuring 58 each slot 16 of the plurality of slots and the latch 20 so that when the latch 20 engages one slot 16 of the plurality of slots a minimum gap remains between the latch 20 and the one slot 16 engaged, before the method 50 ends at 59.

As discussed briefly above, the ducts 10 may have to be connected to other ducts, either in a straight path, to accommodate a bend or change in path, or to provide for more pathways. As such, the inventor recognized a need for joints or connectors which may be used with the ducts 10 so as to provide for securing the joints or connectors to the joints and for ease of removal of the joints or connectors should access within the ducts 10 be needed.

Figure 6:
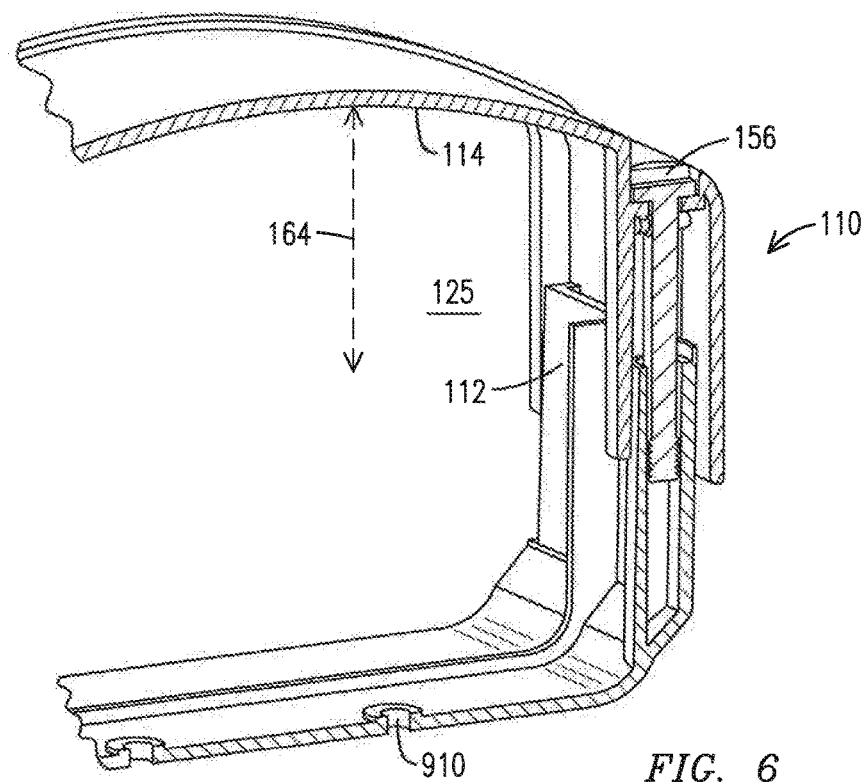
FIG. 6 shows a cross sectional view of a part of a duct connector or joint.

FIG. 6 shows a cross sectional view of a part of a duct connector or joint. This connector may be used to connect two joints together where a path is not changed or altered. The connector or joint 110 may include a lower half 112 and an upper half 114, where the lower half 112 fits within the upper half 114. The lower half 112 and the upper half 114 may be spaced apart by a selective distance 164 and then connected together using a cam screw 156. In a non-limiting example, the cam screw 156 may be made from a polyethylene plastic (PE) material. However, the cam screw 156 may be made from any type of material provided that the cam screw 156 is capable of connecting the upper and lower halves 112, 114 as discussed herein.

Although FIG. 6 depicts the cam screw 156 being used to connect the upper and lower halves 112, 114, the embodiments are not limited to the use of a cam screw to connect the upper and lower halves and include the use of any type of fastener that can be passed through the openings in the upper and lower halves 112, 114, as discussed below, and preferably releasable. In another embodiment, the upper half 114 may be configured to fit within a lower half 112, however, the illustrated version was preferred since this configuration would further assist with preventing or minimizing water, such as but not limited to rain water or sprinkler water from being able to sit on where the halves meet and eventually seep through where the halves 112, 114 meet and into the opening 125 within the two halves 112, 114.

Figure 7:
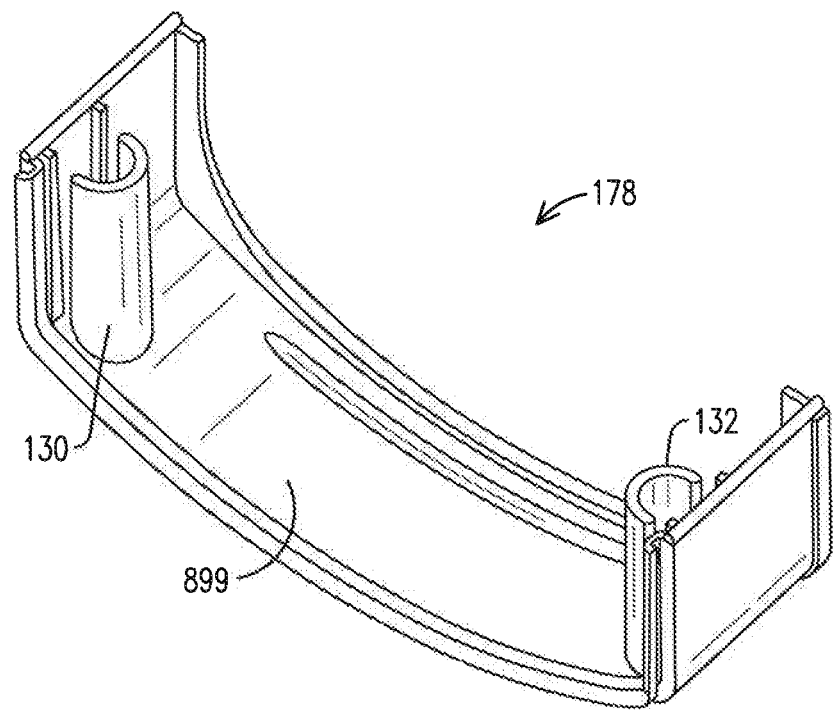
FIG. 7 shows a perspective view of an upper half of the connector of FIG. 6.
Figure 8:
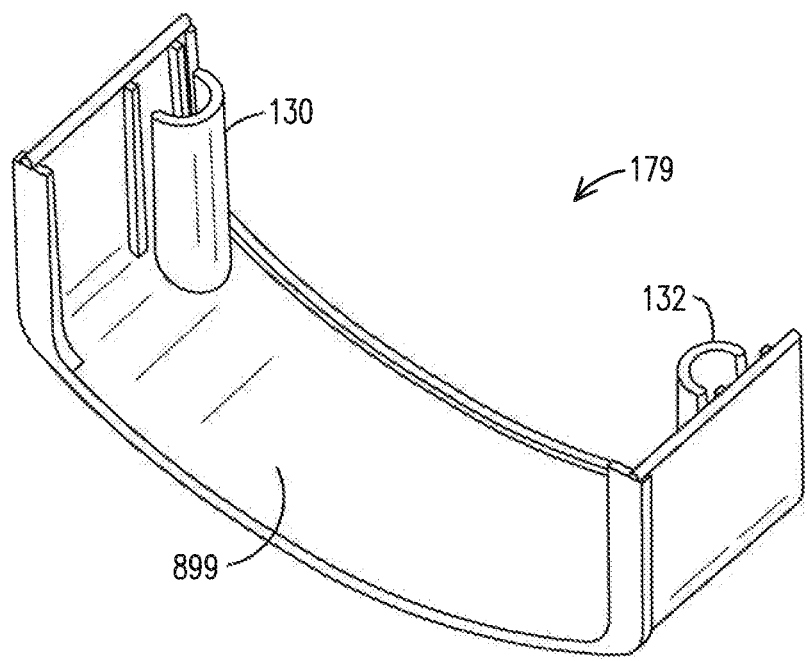
FIG. 8 shows a perspective view of another upper half of the connector of FIG. 6.
Figure 9:
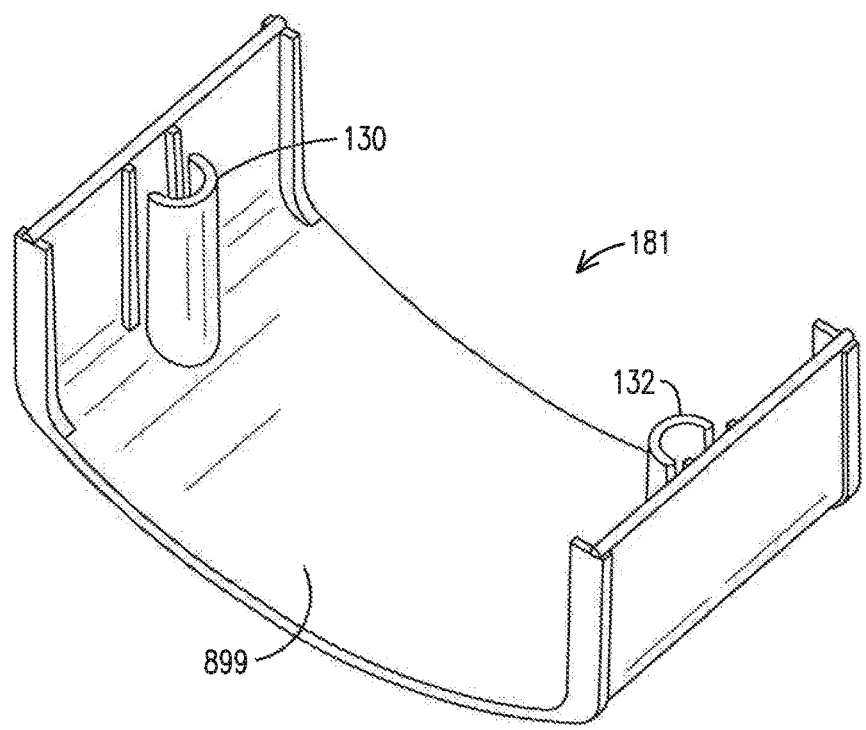
FIG. 9 shows a perspective view of another upper half of the connector of FIG. 6.
Figure 10:
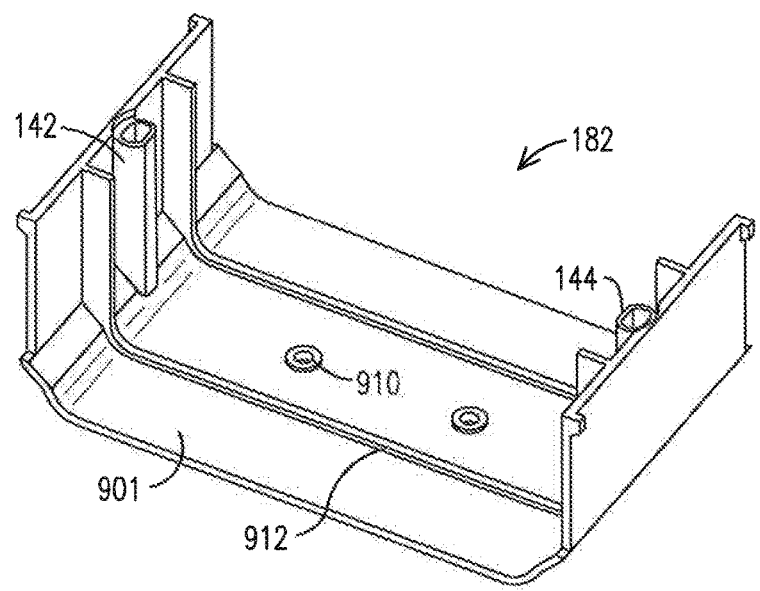
FIG. 10 shows a perspective view of a lower half of the connector of FIG. 6.
Figure 11:
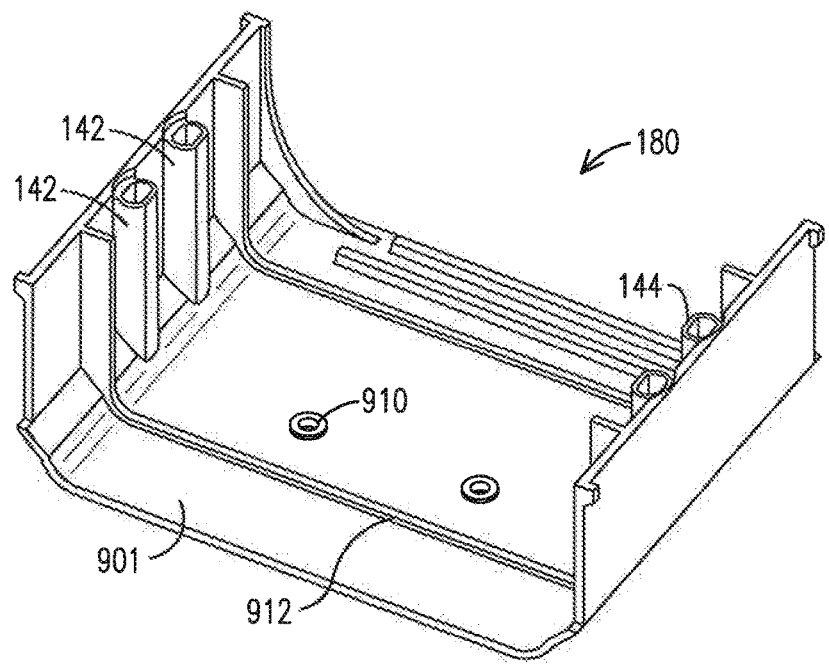
FIG. 11 shows a perspective view of a lower half of another connector.

Though not drawn to scale, FIGS. 7-9 illustrate three upper halves 178, 179, 181 of a connector or joint 110 illustrated in FIG. 6 which may be secured to a lower half 182 of the connector 110 illustrated in FIG. 10 Also shown in FIG. 10 is a rib 912. The rib may extend from each corner within the lower half to increase an inherent strength of the lower half. The rib 912 may also be used as a stopper to which a duct 10 abuts against when located within the connector or joint 110. In both FIGS. 10 and 11 an inner surface 901 associated with each respective lower half is shown. Likewise, in FIGS. 7-9 an inner surface 899 associated with each respective upper half is shown. FIGS. 10 and 11 also show holes, or openings, 910 through which fasteners may be inserted to attach the lower half to a surface, such as, but not limited to, a building. FIG. 11 shows another embodiment of a lower half 180 of a connector 110 which provides for a direct connection. This embodiment provides for two housings 144 provided to guide the upper half and to secure a cam screw 157 as further described herein. In an embodiment, upper halves illustrated in FIGS. 7-8 may attach adjacently to each other with the lower half 180 illustrated in FIG. 11.

Figure 12:
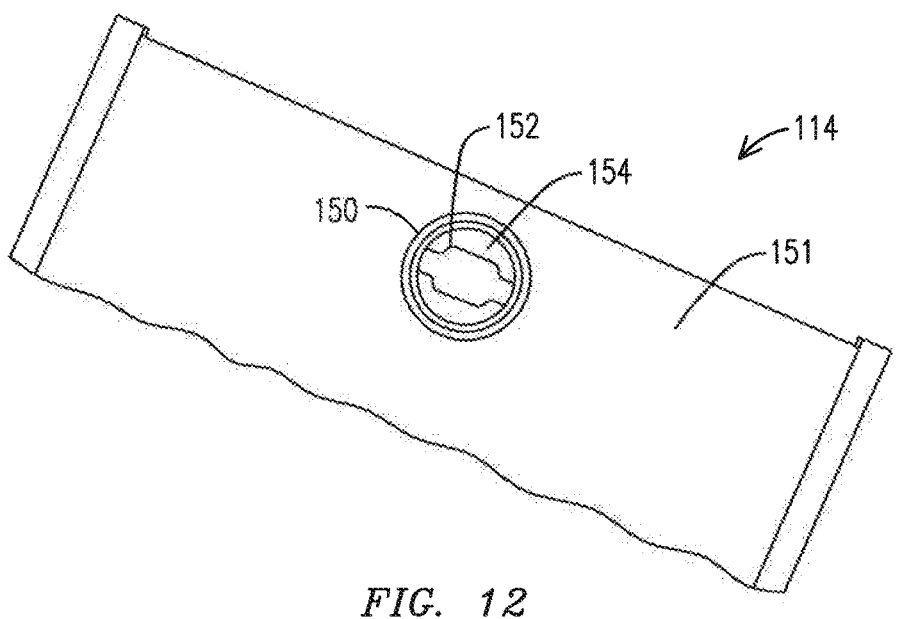
FIG. 12 shows a plan view of an opening in an outer surface of the upper half of FIG. 7.
Figure 13:
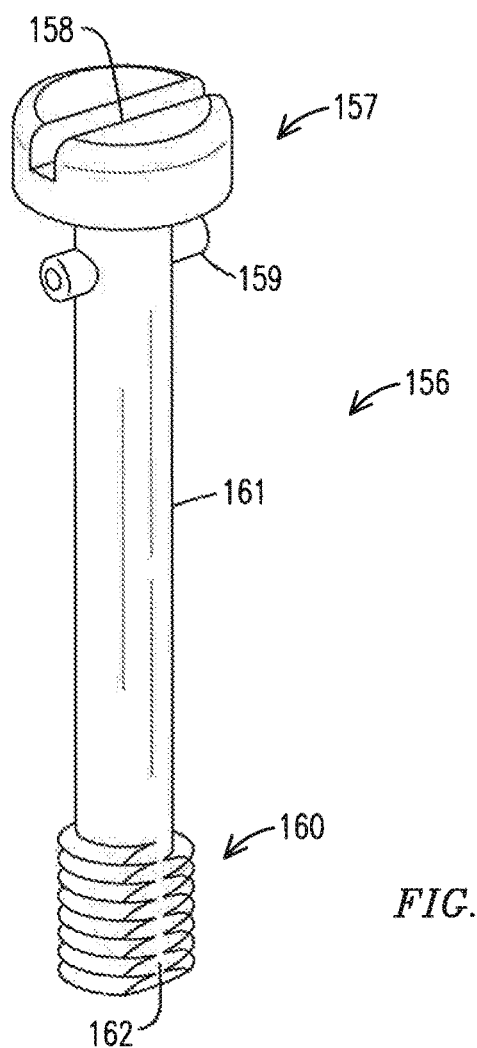
FIG. 13 shows a side perspective view of a cam screw for use with a connector.
Figure 14:
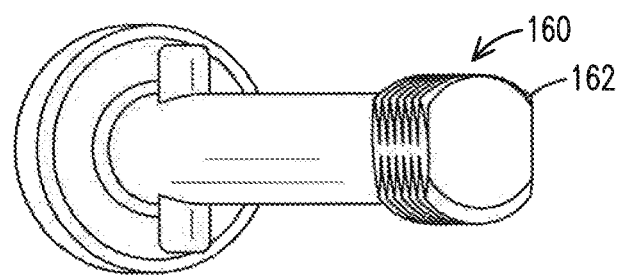
FIG. 14 shows a bottom perspective view of the cam screw of FIG. 11.

FIG. 12 illustrates a top surface 151 of the upper half 114. As illustrated in FIG. 12, the top surface 151 may define a hole 150 and a shoulder 154 within the hole 150 defines a slot 152. The cam screw 156 may be inserted within the hole 150 and the slot 152, in the manner discussed in greater detail below. FIGS. 13-14 illustrate the cam screw 156 that may include a head portion 157 with a slot 158 to receive an end of a tightening tool and a pin 159 below the head portion 157. The cam screw 156 may also include a length portion 161 with a first end attached to the head portion 157 and a second end with a cam-shaped threading 160 including teeth 162.

In operation, the adjustable channel system 110 may be assembled by first aligning the lower half 112 within the upper half 114, as illustrated in FIG. 6. To align the lower half 112 and the upper half 114, the semi-cylinder shells 130, 132 of the upper half 114 may be aligned with the respective oblong housings 142, 144 of the lower half 112, such that the semi-cylinder shells 130, 132 enclose the respective oblong housings 142, 144, as the lower half 112 is aligned to be positioned within the upper half 114. After the lower half 112 is aligned to be positioned within the upper half 114, the separation between lower half 112 and upper half 114 is then adjusted until the desired spacing 164 is achieved, based on the installation requirements of the particular air conditioning line sets being positioned within the adjustable channel system 110. In a non-limiting example, a size or a number of the air conditioning line sets to be positioned within the adjustable channel system 110 may determine the desired spacing 164 between the lower half 112 and the upper half 114, such that an area of the opening 125 within the adjustable channel system 110 is at least equal to a minimum area required for the installation.

Figure 15:
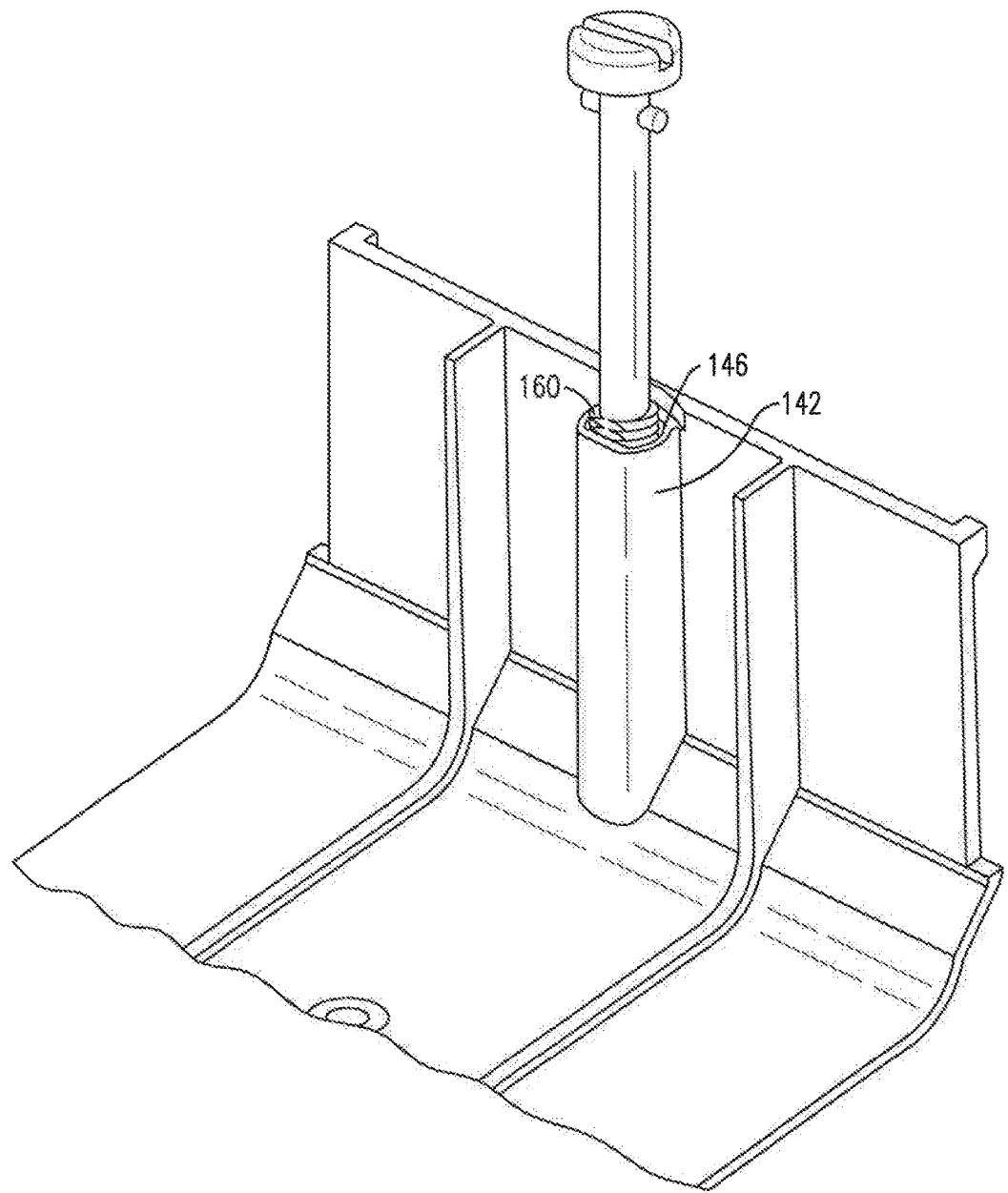
FIG. 15 shows an isolated perspective view of the cam screw in an unlocked position within the lower half of the connector of FIG. 6.
Figure 16:
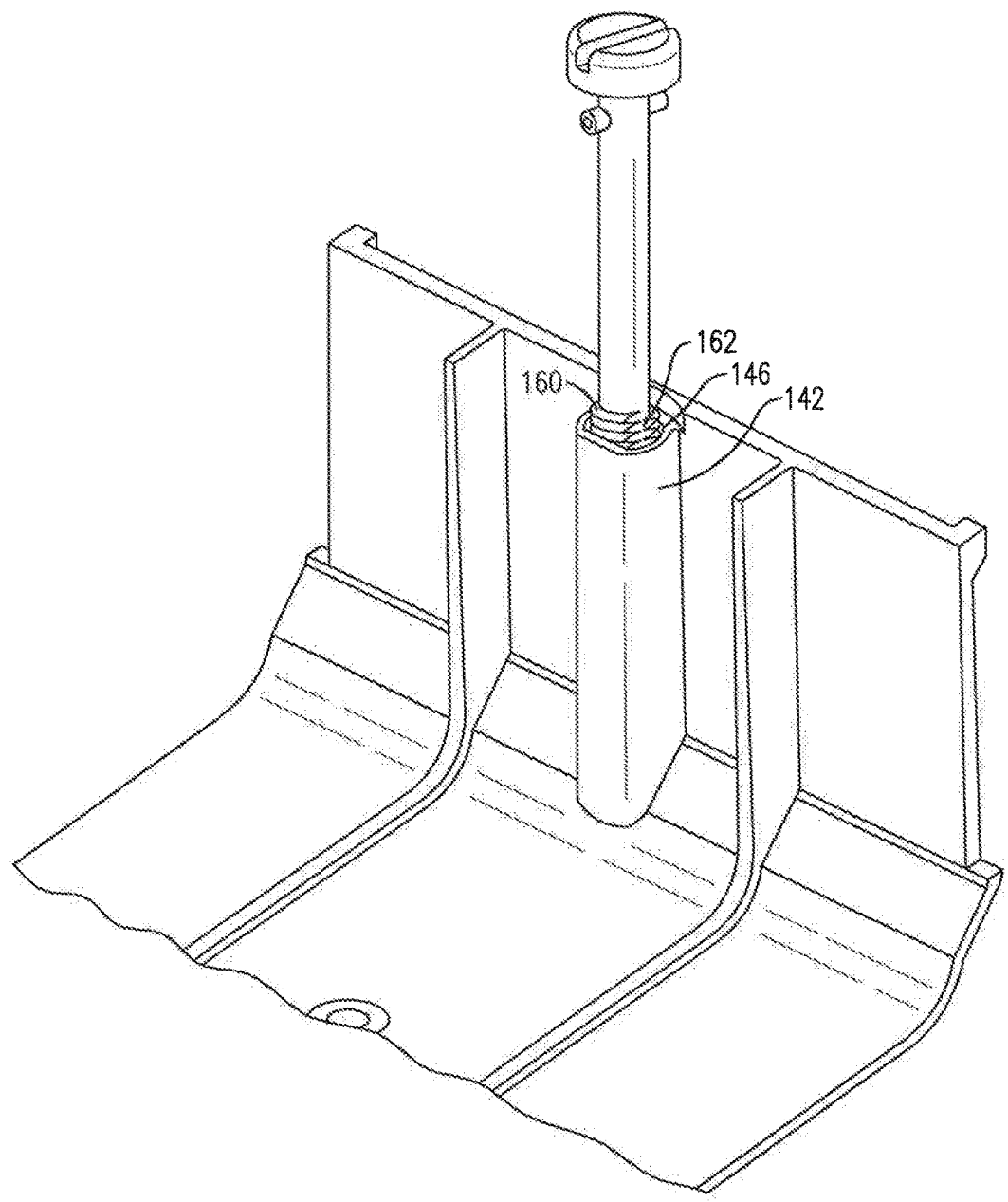
FIG. 16 shows an isolated perspective view of the cam screw in a locked position within the lower half of the connector of FIG. 6.

After the lower half 112 and the upper half 114 are aligned and spaced apart by the appropriate spacing 164, the cam screw 156 may be inserted into the hole 150 of the upper half 112, by aligning the pin 159 of the cam screw 156 with the slot 152, so that the pin 159 passes the shoulder 154 and the threading 160 enters the hole 146 of the oblong housing 142, 144, as illustrated in FIG. 6. As illustrated in FIG. 15, the threading 160 initially enters the hole 146 of the oblong housing 142, 144 in an unlocked position, such that the cross-section of the threading 160 is aligned with the cross-section of the hole 146. After the cam screw 156 is inserted into the hole 150 such that the pin 159 passes the shoulder 154 of the upper half 112, the cam screw 156 may then be turned so that the threading 160 rotates to a locked position where the teeth 162 of the threading 160 engage an inner surface of the hole 146 of the oblong housing 142, 144, as illustrated in FIG. 16. Additionally, upon turning the cam screw 156, the pin 159 rotates to a position under the shoulder 154 out of alignment with the slot 152, so that the cam screw 156 is secured within the hole 150 and the lower and upper halves 112,114 are secured together. This process is repeated for each semi-cylinder shell/oblong housing pairing between the lower and upper halves 112, 114, until a respective cam screw 156 is received within the hole 150 of each semi-cylinder shell and the hole 146 of each oblong housing.

Figure 17A:
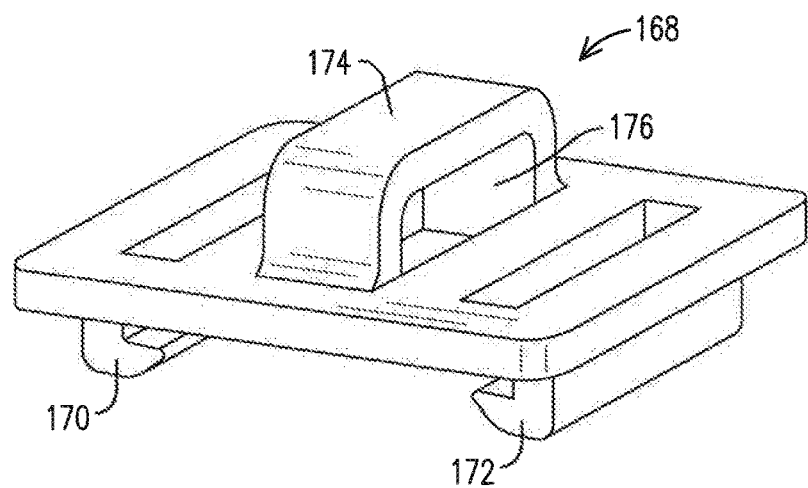
FIG. 17A shows a top perspective view of a clip attachable to an adjustable channel system of FIG. 6.
Figure 17B:
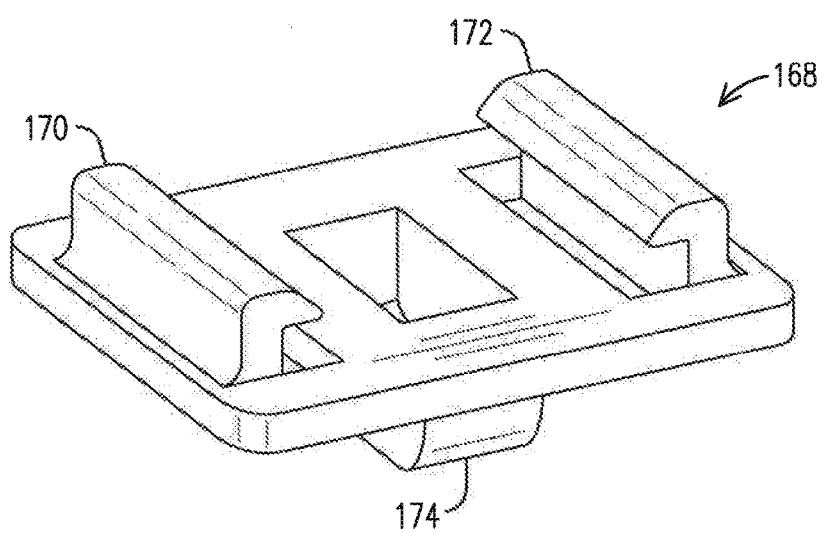
FIG. 17B shows a bottom perspective view of the clip of FIG. 17A.

FIGS. 17A-17B illustrate a clip 168 used in the adjustable channel system 110 to hold one or more air conditioning line sets within the lower and upper halves 112, 114. In a non-limiting example, the clip 168 may be made from an acrylonitrile butadiene styrene plastic (ABS) material. As illustrated in FIGS. 17A-17B, the clip 168 may include a pair of hooks 170, 172 that are configured to engage a respective hook or loop member (not shown) on an interior surface of either of the lower and upper halves 112, 114, to secure the clip 168 to the interior surface of either of the lower and upper halves 112, 114. The clip 168 may also include a solid member 174 to define an opening 176 in the clip 168, to pass through one or more air conditioning line sets, so that the air conditioning line set(s) can be securely held to the interior surface of the lower and upper halves 112, 114. The hooks 170, 172 of the clip 168 may be inserted within the grooves 29A, 29B of the lower half 12 of the system 10 of FIG. 2, and the line sets may be directed through the opening 176, to secure the line sets along the bottom portion 37 of the lower half 12. The lower half 112 of the system 110 may have grooves that are similar to the grooves 29A, 29B of the lower half 12 of FIG. 4, to receive the hooks 170, 172 of the clip 168, and similarly secure the line sets to the lower half 112 through the opening 176. In a non-limiting example, the clip need not have the same configuration as the clip 168 depicted in FIGS. 17A-17B, provided that the clip has one or more hooks to secure the clip to the upper or lower half of the system and a member with an opening to secure the line sets to the upper or lower half.

Figure 18:
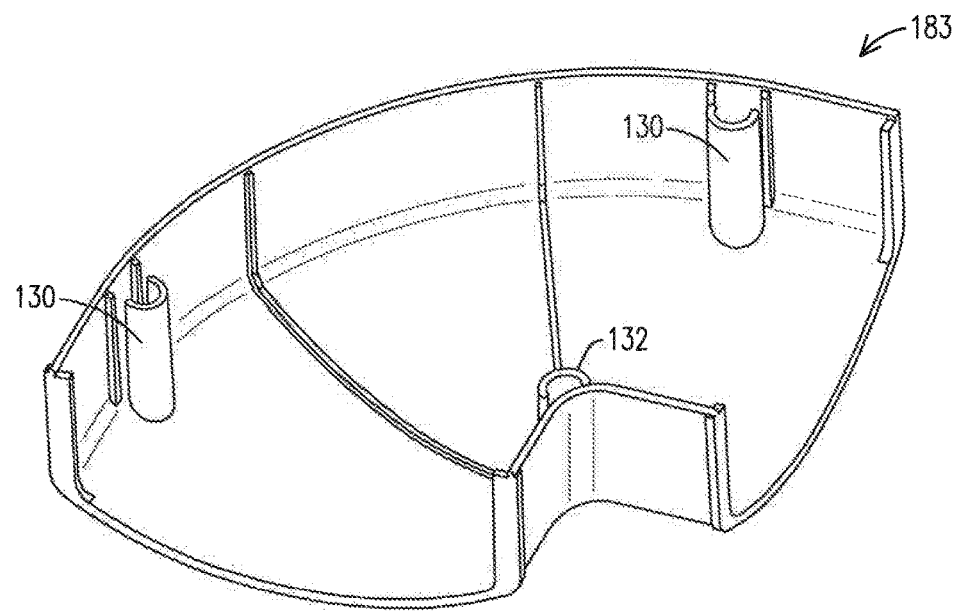
FIG. 18 shows a perspective view of an upper half of another embodiment of a connector.
Figure 19:
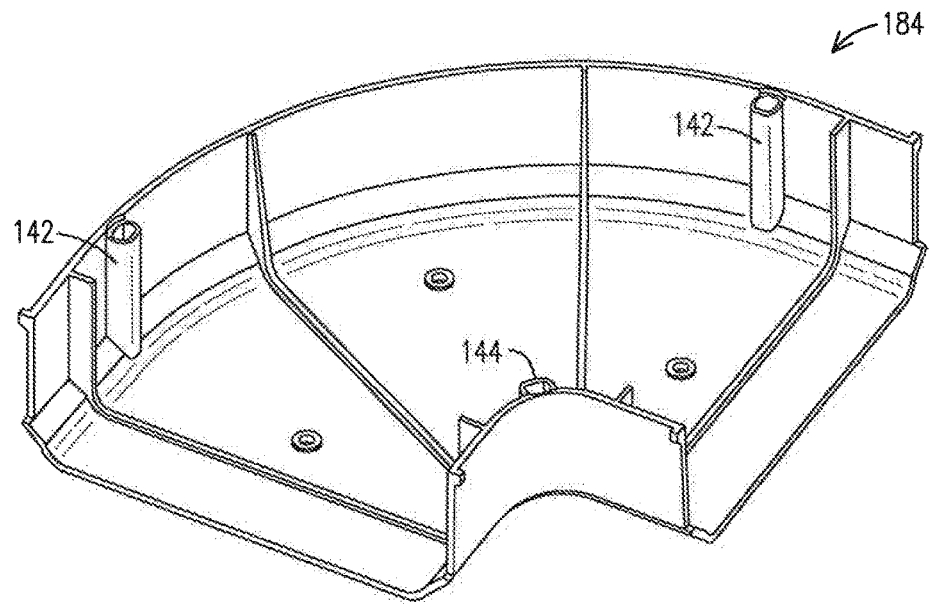
FIG. 19 shows a perspective view of an upper half of another embodiment of a connector.
Figure 20:
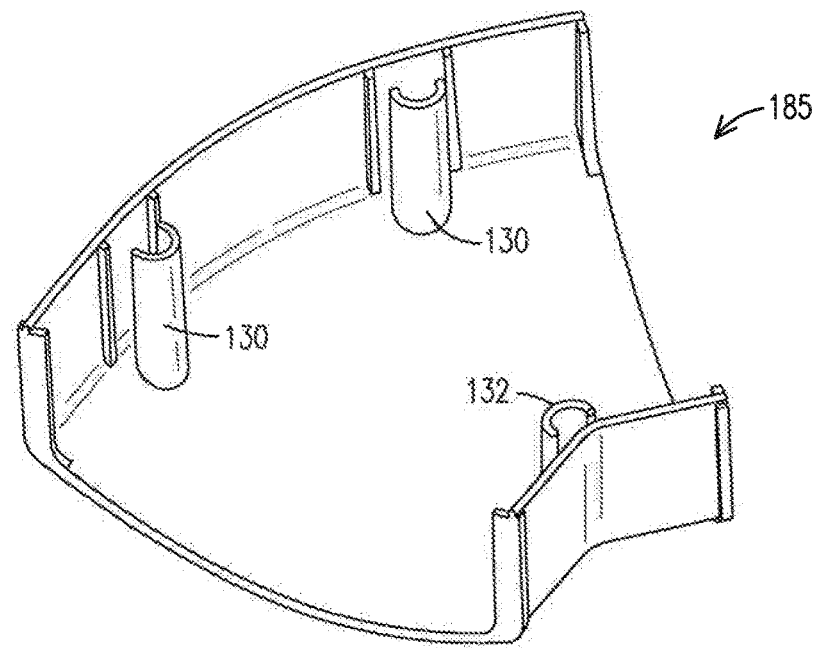
FIG. 20 shows a perspective view of an upper half of a curved connector.
Figure 21:
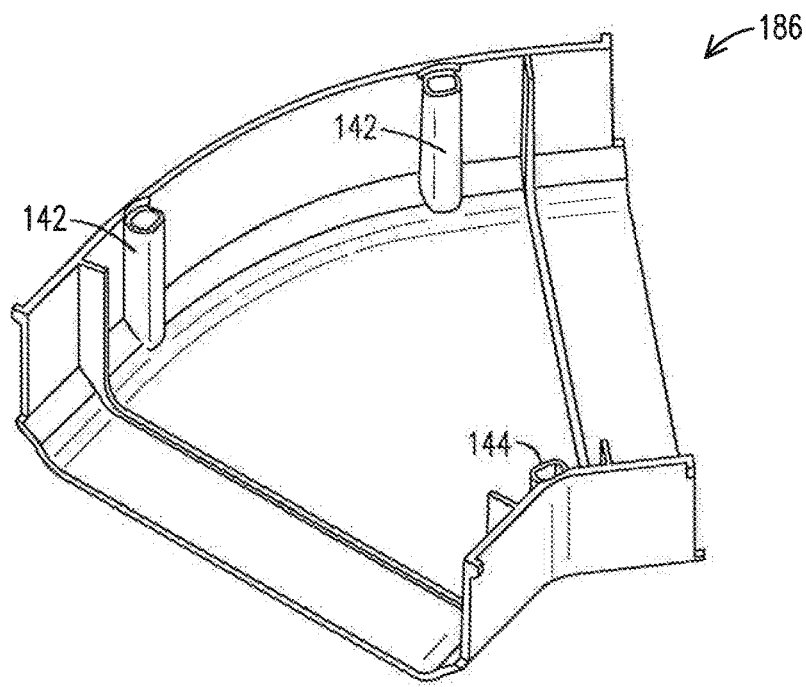
FIG. 21 shows a perspective view of a lower half of a curved connector.
Figure 22:
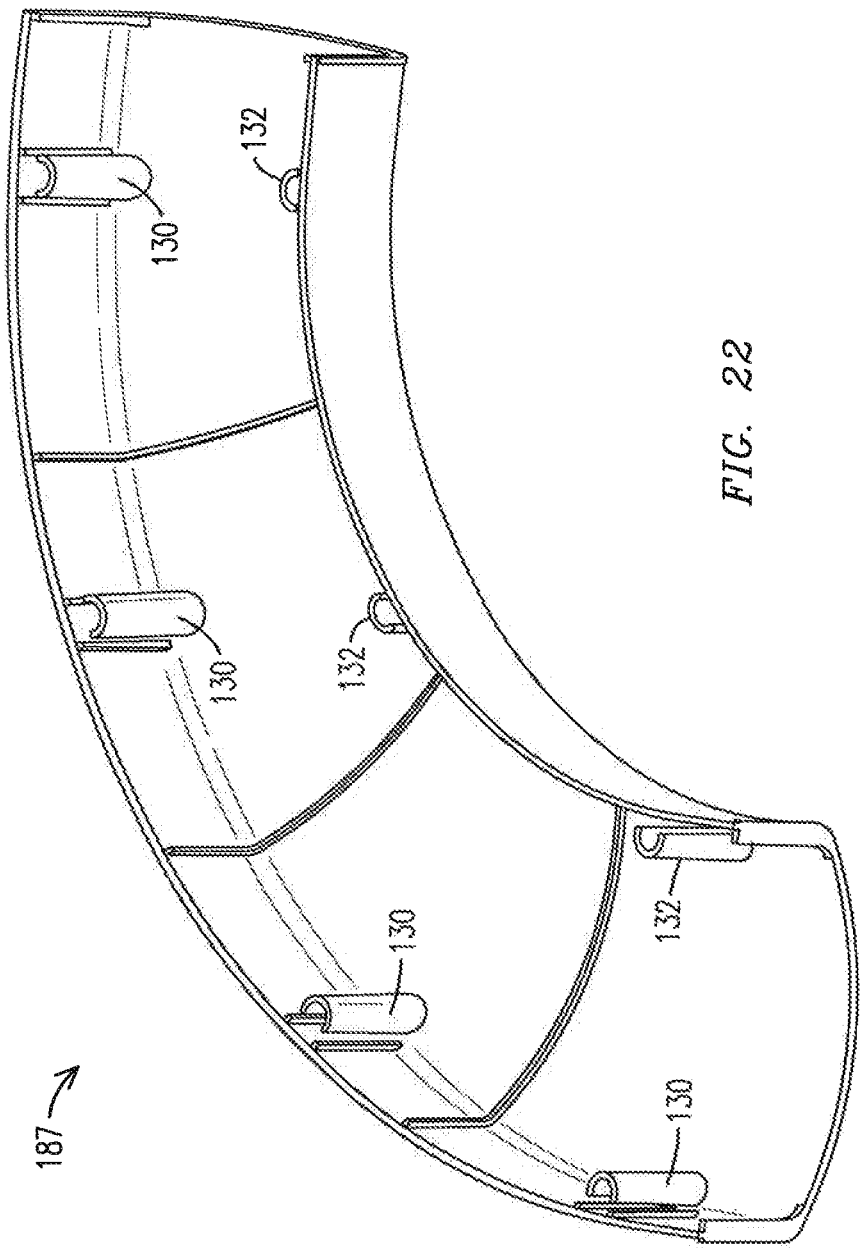
FIG. 22 shows a perspective view of an upper half of a partial curved connector.
Figure 23:
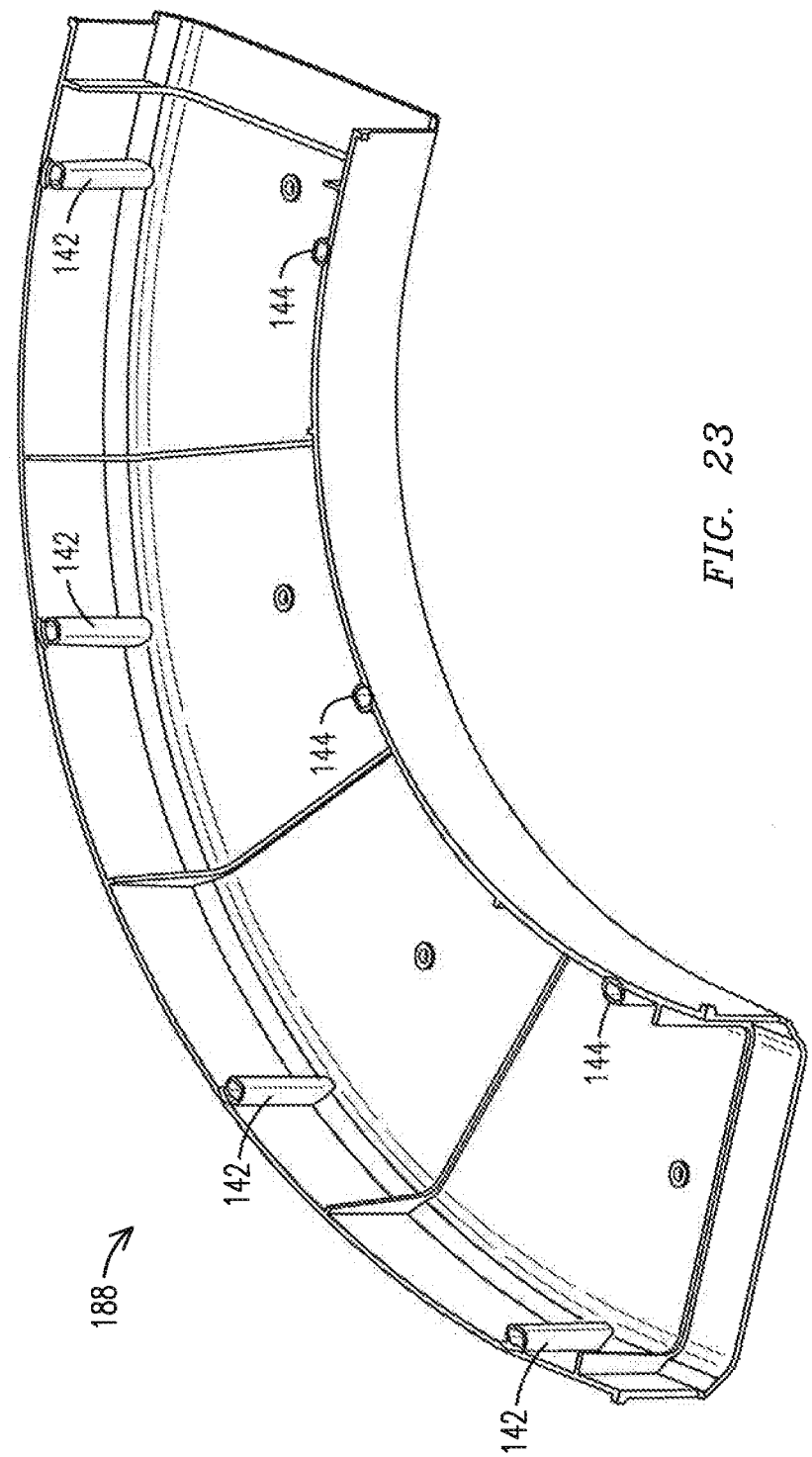
FIG. 23 shows a perspective view of a lower half of a partial curved connector.

FIGS. 18-29 illustrate other embodiments of lower and upper halves which may be used individually or collectively within the adjustable channel system 110. The lower and upper halves of FIGS. 16-29 are secured together in the same manner as the lower and upper halves 112, 114 discussed above, specifically with use of a cam screw 157, with the exception that each lower and upper half pair may have a different number and/or positioning of the semi-cylinder shells and oblong housings to dictate a particular change in path for the duct 10 or function of the system 5. However, the method used to secure the lower and upper halves in Thus, for illustration purposes only, FIGS. 18-29 may use the same technique or method used to secure the lower and upper halves as discussed with FIGS. 6-17. FIG. 18 illustrates a part with an upper half 183 which may be secured to a lower half 184 illustrated in FIG. 19, for a curved part, joint or connector, of the adjustable channel system 5 to direct the air conditioning line sets in a curved direction, such over an orthogonal turn in the system, in an non-limiting example. Although FIGS. 18-23 depict that the upper and lower halves 183, 184 are designed to accommodate an orthogonal turn in the system, the embodiment of the part of the upper and lower halves are not limited to any particular angular turn and may be configured to accommodate any angular turn in the system. FIG. 20 illustrates a part with an upper half 185 which may be secured to the lower half 186 illustrated in FIG. 21, for a curved connector 110 of the adjustable channel system 5 to direct the air conditioning line sets in a curved direction, such as over an approximate 45 degree angle turn in the system, in an non-limiting example. However, the connector 110 including the upper and lower halves 186, 186 are not limited to any specific angular turn in the system and may be configured to accommodate any angular turn in the system. FIG. 22 illustrates a part with an upper half 187 which may be secured to the lower half 188 illustrated in FIG. 23, for a curved connector of the adjustable channel system 5 to direct the air conditioning line sets in a curved direction.

Figure 24:
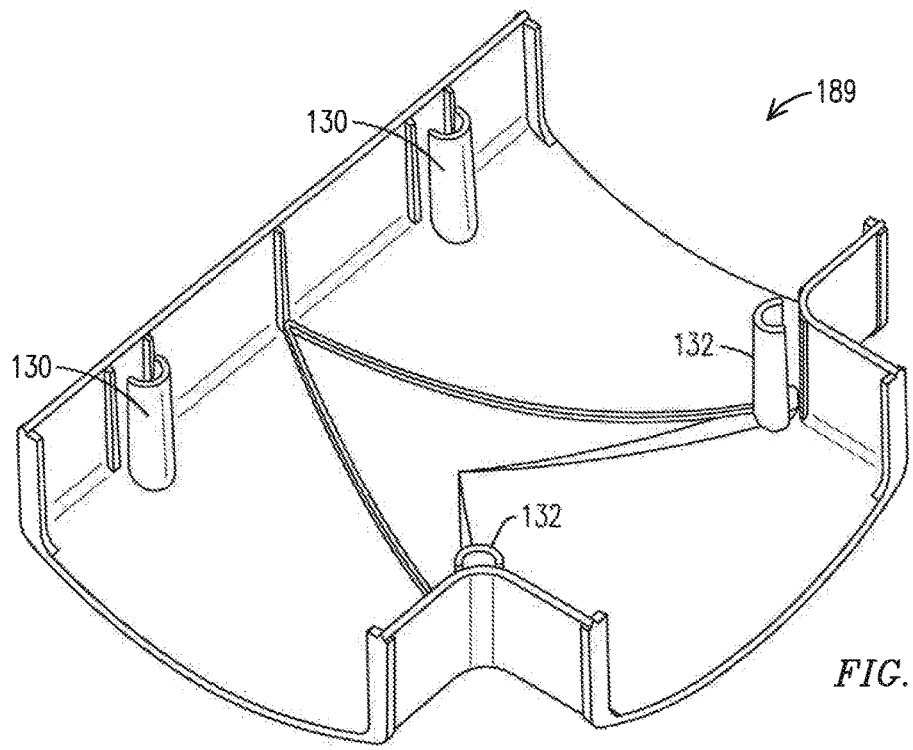
FIG. 24 shows a perspective view of an upper half of a part of a T-connector.
Figure 25:
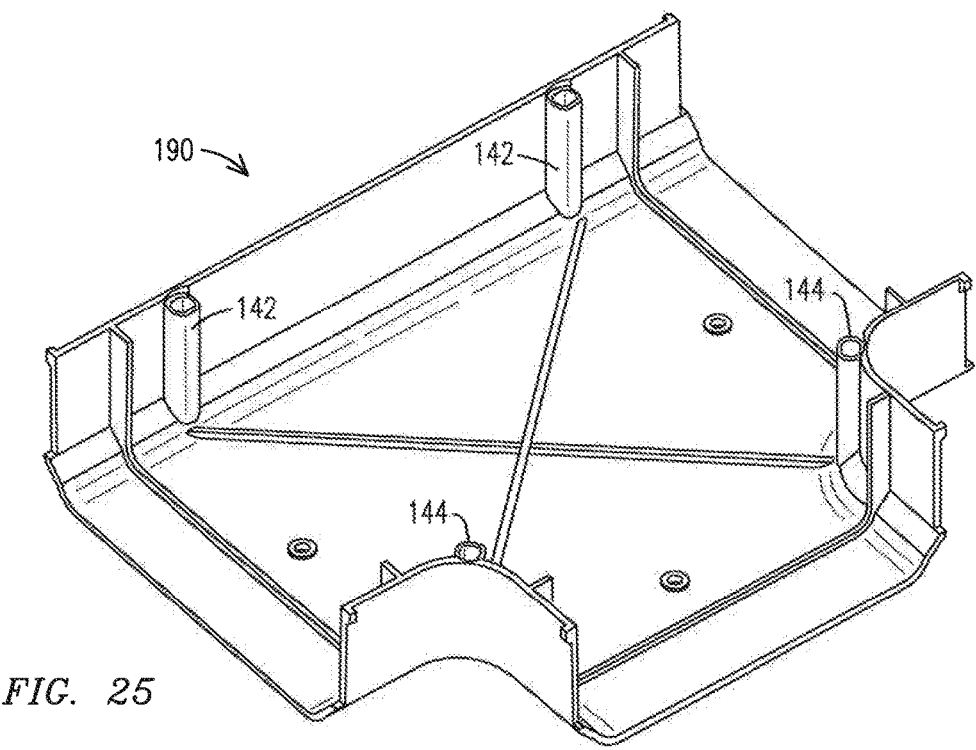
FIG. 25 shows a perspective view of a lower half of a part of the T-connector.

FIG. 24 illustrates a part with an upper half 189 which may be secured to the lower half 190 illustrated in FIG. 25, for a T-junction connector 110 of the adjustable channel system 5. Although the embodiments of the connector 110 including the upper and lower halves 189, 190 depicts in FIGS. 24 and 25 are configured to accommodate a T-junction in the system, the embodiment is not limited to a T-junction connector and the upper and lower halves may be designed to accommodate a junction of any number of channels within the system 5.

Figure 26:
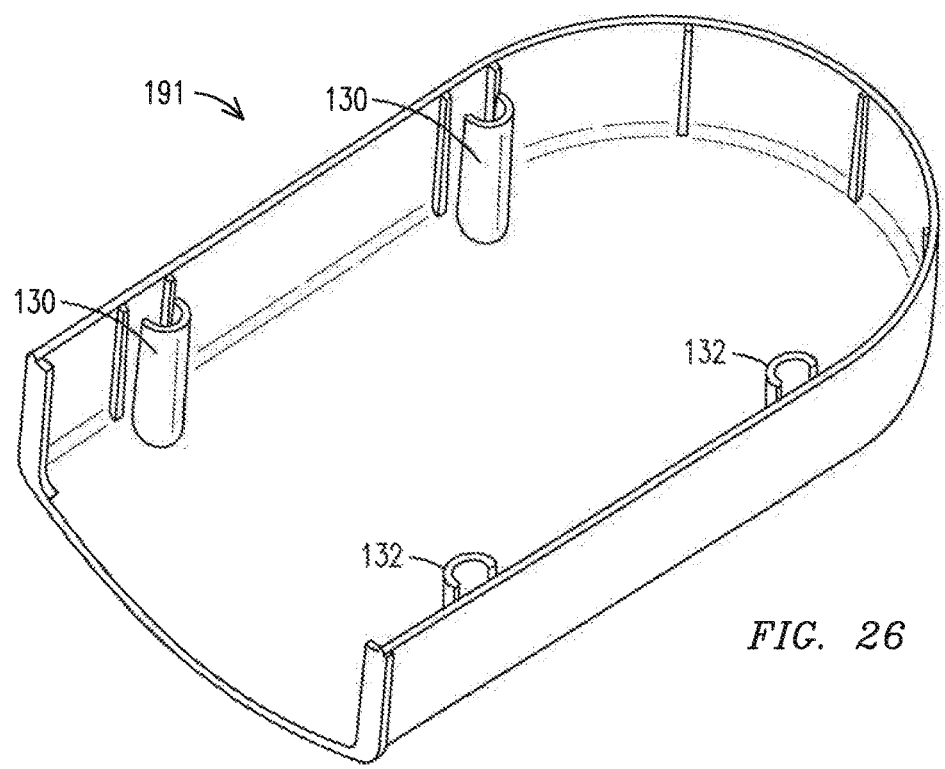
FIG. 26 shows a perspective view of an upper half of a part of an adjustable channel system.
Figure 27:
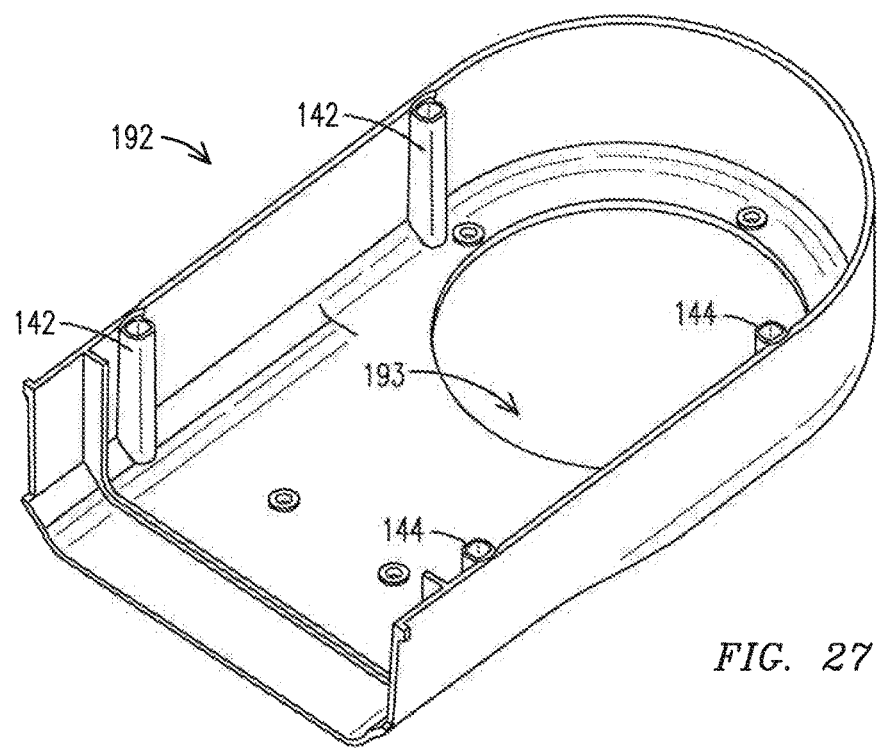
FIG. 27 shows a perspective view of a lower half of the part of the adjustable channel system of FIG. 24.

FIG. 26 illustrates a part of a connector 110 including an upper half 191 which may be secured to the lower half 192 illustrated in FIG. 27, for an inlet part of the adjustable channel system 5 positioned at an entry point of the air conditioning line sets along an exterior of a building into the building, where the lower half 192 defines an opening 193 positioned to be aligned with an opening on the exterior of the building, to direct the air conditioning line sets into the building.

Figure 28:
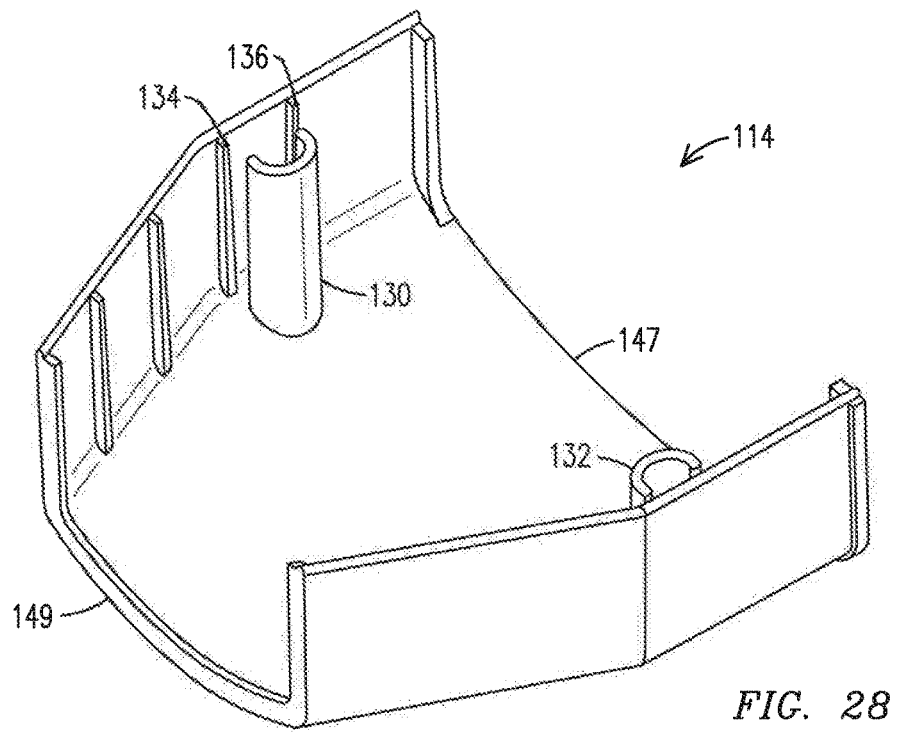
FIG. 28 shows a perspective view of an upper half of a part of an adjustable channel system.
Figure 29:
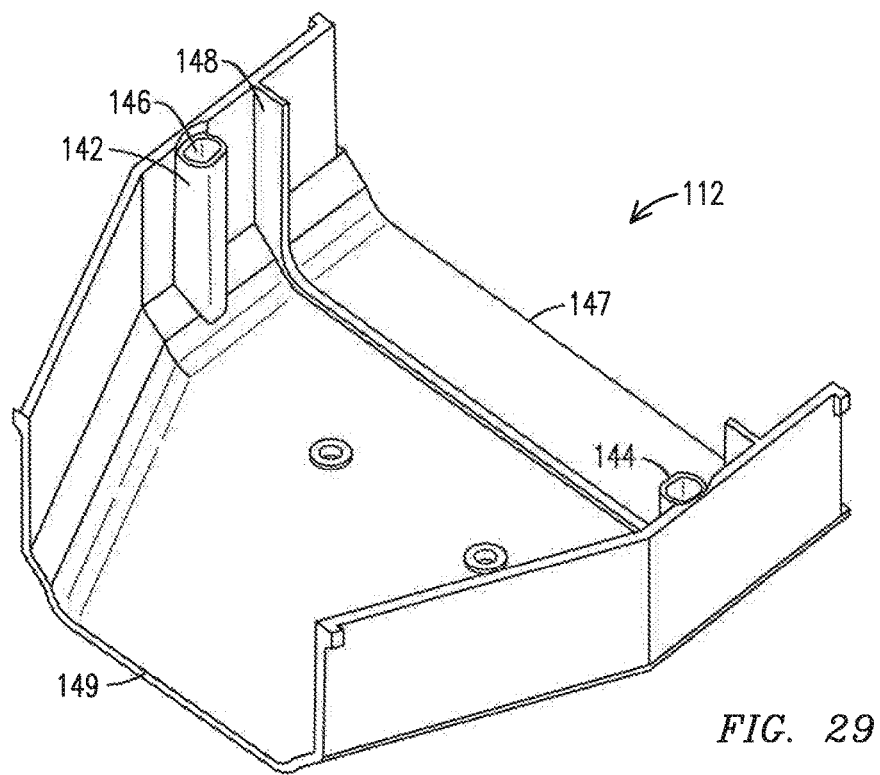
FIG. 29 shows a perspective view of a lower half of the part of the adjustable channel system.

FIG. 28 shows the upper half 114 of another connector 110 which expands to provide a wider opening. As further illustrated and which may be provided with each upper half disclosed herein, a pair of semi-cylindrical shells 130, 132 positioned on opposite sides of the upper half 114. Additionally, a pair of vertical ridges 134, 136 may be positioned on either side of each respective semi-cylindrical shell 130, 132. FIG. 29 shows the lower half 112 of the other connector 110 which expands to provide a wider opening. As illustrated with other connectors herein, this lower half 112 includes an oblong housing 142, 144 positioned on opposite sides of the lower half 112. The oblong housing 142, 144 may define a hole 146 which extends through the length of the oblong housing 142, 144, and has an oblong cross-section. A vertical flange 148 may be provided on an inside surface of each side of the lower half 112 beside the oblong housing 142, 144. The lower half 112 and upper half 114, when joined in the manner illustrated in FIG. 6, may provide a portion of the channel system 110 to direct the air conditioning line sets, where a width of the combined lower and upper halves 112, 114 narrows from an inlet 147 to an outlet 149 of the lower and upper halves 112, 114. In a non-limiting example, the lower and upper halves 112, 114 may be utilized within the adjustable channel system 110, in the event that the air conditioning line sets need to be guided through an area of narrowing width. Although FIG. 6 depicts that the system 110 includes the lower half 112 and the upper half 114 secured together, the embodiments are not limited to two halves of a system being secured together and may include a system with more than two portions, where a first and a second portion of the system are secured together.

Figure 30:
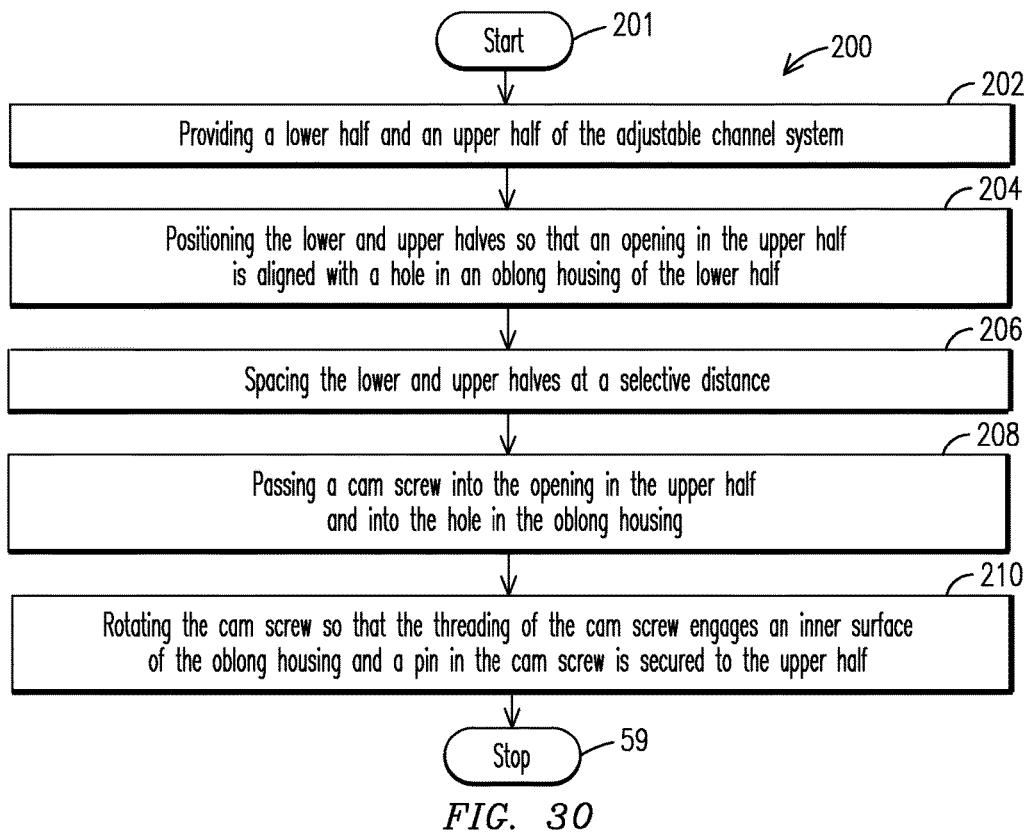
FIG. 30 shows a flowchart illustrating an embodiment of a method.

FIG. 30 illustrates a flowchart depicting a method 200 which may begin at 201 by providing a lower half 112 and an upper half 114 of the adjustable channel system 110. The method 200 may further include positioning 204 the lower and upper halves 112, 114 so that the hole 150 in the upper half 114 is aligned with the hole 146 in the oblong housing 142,144 of the lower half 112. The method 200 may further include spacing 206 the lower and upper halves 112, 114 at a selective distance 164. The method 200 may further include passing 208 the cam screw 156 into the hole 150 and the threading 160 of the earn screw 156 into the hole 146 in the oblong housing 142, 144. The method 200 may further include rotating 210 the cam screw 156 so that the teeth 162 of the threading 160 engage an inner surface of the oblong housing 142 of the lower half 112 and the pin 159 is secured under the shoulder 154 of the upper half 114, before ending at 211.

Figure 31:
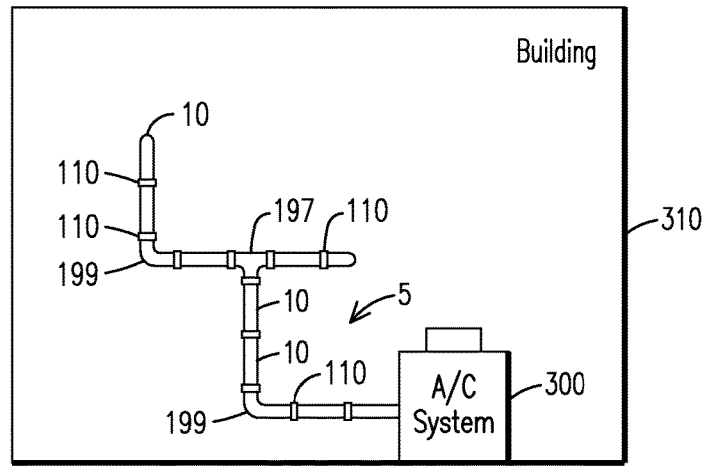
FIG. 31 shows a pictorial embodiment of the system in use.

FIG. 31 illustrates a pictorial representation of the system utilized with a building and an air conditioning system. As illustrated, the air conditioning system 300 is located outside of the building 310. A duct system 5 is disclosed for covering line sets the run from the air conditioning system into the building. The duct system 5 comprises a plurality of ducts 10 as disclosed herein. Joints 110 are provided to connect adjacent ducts 10 together to provide for a continuous path. A joint 110 with a bend is provided to change a directional path of the duct system 5. A joint 110 end cover 191, 192 is provided where the line sets enter the building 310. Also illustrated are a T-connector 197 (an embodiment shown by its halves in FIGS. 24 and 25) and a curved connector 199 (embodiments as shown by its respective halves in either the combination of FIGS. 18 and 19, FIGS. 20 and 21, and FIGS. 22 and 23).

As discussed herein, in an embodiment, in constructing the duct system 5 for use, the lower portions are secured to the building, such as with screws or another form of attaching these pieces to the building. The line sets are then placed within the lower halves. The upper halves of the ducts 10 are then fitted onto the lower halves, followed by securing the upper halves of the joints to their respective lower halves. If access is later required within the ducts, such as to reach the line sets, the cam screws are released to remove the upper halves of the joints. An installer may then apply an opposing force to separate the edge of the upper half of each respective upper half of a specific duct, such as by grabbing the edge of the upper half and puling it away from the lower half, to release the locking mechanism, or engaging member, from the securing mechanism, or receiving member, while pulling the upper half away from the lower half. Neither part is damage by this removal so in a preferred embodiment, both the upper half and the lower half may be reused. If any damage was to occur, it may occur to the upper half. In such a situation, only the upper half would require replacing.

While various disclosed embodiments have been described above, it should be understood that they have been presented by way of non-limiting examples only, and not limitation. Numerous changes to the subject matter disclosed herein can be made in accordance with the embodiments disclosed herein without departing from the spirit or scope of the embodiments. In addition, while a particular feature may have been disclosed with respect to only one of several implementations, such feature may be combined with one or more other features of the other implementations as may be desired and advantageous for any given or particular application.

Thus, the breadth and scope of the subject matter provided herein should not be limited by any of the above explicitly described embodiments. Rather, the scope of the embodiments should be defined in accordance with the following claims and their equivalents.

The terminology used herein is for the purpose of describing particular embodiments only and is not intended to be limiting. As used herein, the singular forms "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein specifically disclose an adjustable channel system for air conditioning line sets. Additionally, the embodiments may be used for other devices or systems where an enclosed fixture which minimizes exposure to moisture and may be formed and disassembled with minimum use of tools.

Thus, while embodiments have been described with reference to various embodiments, it will be understood by those skilled in the art that various changes, omissions and/or additions may be made and equivalents may be substituted for elements thereof without departing from the spirit and scope of the embodiments. In addition, many modifications may be made to adapt a particular situation or material to the teachings of the embodiments without departing from the scope thereof. Therefore, it is intended that the embodiments not be limited to the particular embodiment disclosed as the best mode contemplated, but that all embodiments falling within the scope of the appended claims are considered.

The invention claimed is:

1. A system for covering a plurality of line sets having a plurality of respective sizes, said system comprising:
   an upper half having a first sidewall, a second sidewall, a top surface from the first and second sidewalls, a first plurality of slots formed along an inner surface of the first sidewall and which extend inward in the upper half and a second plurality of slots formed along an inner surface of the second sidewall and which extend inward in the upper half wherein the first plurality of slots comprises at least a lowest slot and the second plurality of slots comprises at least a lowest slot;
   a tab being an extension of the first sidewall beyond the lowest slot of the first plurality of slots; and
   a lower half to store therein the plurality of line sets, the lower half including a first sidewall, a second sidewall and a bottom portion from the first sidewall and the second sidewall of the lower half, a first latch extending angularly outward from the first sidewall of the lower half, a second latch extending angularly outward from the second sidewall of the lower half, said first latch selectively engages a respective one slot of the first plurality of slots and said second latch selectively engages a respective one slot of the second plurality of slots to secure the upper half and the lower half together with an opening of an adjustable size therebetween to accommodate the plurality of line sets,
   wherein the first and second sidewalls of the upper half including the tab fit around the first and second sidewalls of the lower half including the first latch and the second latch such that the first and second sidewalls of the lower half can be moved upward into the upper half between the first and second sidewalls of the upper half to selectively latch the first latch to the respective one slot of the first plurality of slots and selectively latch the second latch to the respective one slot of the second plurality of slots,
   wherein the respective one slot engaged by the first latch and the respective one slot engaged by the second latch are selected to adjust the adjustable size of the opening to correspond to a respective size of the plurality of line sets to be covered by the system, and
   wherein the tab when pulled in a direction away from the lower half separates the upper half and the lower half;
   wherein each slot of the first plurality of slots is defined between a pair of adjacent teeth that extend inward from the inner sidewall at an angle wherein the angle is an obtuse angle with respect to the first sidewall of the upper half; and
   wherein each slot of the second plurality of slots is defined between a pair of adjacent teeth that extend inward from the inner sidewall at the angle with respect to the second sidewall of the upper half.

2. The system of claim 1, wherein:
the upper half has a width that is greater than the lower half.

3. The system of claim 1, wherein the angle of the first plurality of teeth is about 45 degrees.

4. The system of claim 1, wherein the first plurality of slots extend along the first sidewall of the upper half over a longitudinal length of the upper half.

5. The system of claim 1, further comprising:
a second tab, the second tab being an extension of the second sidewall of the upper half beyond the lowest slot of the second plurality of slots; and
the second tab separates the upper half and the lower half upon moving the second tab in an outward direction away from the lower half.

6. The system of claim 1, wherein:
the first latch comprises a first segment and a second segment;
upon the first latch engaging the respective one slot of the first plurality of slots, the first segment of the first latch engages an upper tooth of the respective one slot of the first plurality of slots and the second segment of the first latch engages a lower tooth of the respective one slot of the first plurality of slots;
the second latch comprises a first segment and a second segment; and upon the second latch engaging the respective one slot of the second plurality of slots, the first segment of the second latch engages an upper tooth of the respective one slot of the second plurality of slots and the second segment engages a lower tooth of the respective one slot of the second plurality of slots.

7. The system of claim 6, wherein a width of the first latch being defined as a width between the first and second segments of the first latch such that the first latch is configured to fit within the respective one slot of the first plurality of slots such that a minimum space exists between the first latch and the upper and lower teeth of the first plurality of slots; and wherein a width of the second latch being defined as a width between the first and second segments of the second latch such that the first latch is configured to fit within the respective one slot of the first plurality of slots such that a minimum space exists between the second latch and the upper and lower teeth of the second plurality of slots.

8. The system of claim 1, wherein:
the plurality of line sets are line sets for an air conditioning system; and
the first and second plurality of slots are spaced apart such that a range of sizes of the opening upon engagement of the lower half with the first and second plurality of slots is sufficient to accommodate a range of the respective sizes of the line sets.

9. The system of claim 1, wherein the lower half of the duct includes a rib extending along each corner within the lower half to increase an inherent strength of the lower half.

10. The system of claim 1, wherein the first slots extend along the first sidewall of the upper half over a portion of a longitudinal length of the first sidewall of the upper half; and
wherein the second slots extend along the second sidewall of the upper half over a portion of a longitudinal length of the second sidewall of the upper half.

11. The system of claim 1, further comprising a clip attached to the bottom portion of the lower half, said clip defining a clip opening to receive the plurality of line sets to secure the plurality of line sets to the lower half.

12. The system of claim 11, wherein:
the lower half includes a plurality of rail members extending along the bottom portion and a pair of grooves defined between the plurality of rail members; and
the clip includes a pair of hook members sized to be slidably received within the pair of grooves.

13. The system of claim 1, wherein the top surface is an arcuate top surface from the first sidewall and the second sidewall of the upper half.

14. The system of claim 1, wherein:
when the respective one slot of the first plurality of slots engaged by the first latch is a first slot of the first plurality of slots of the upper half and the respective one slot of the second plurality of slots engaged by the second latch is a first slot of the second plurality of slots of the upper half, the upper half and the lower half are separated by a first separation so that the opening has a first size to accommodate the plurality of line sets having at least the first size;
when the respective one slot of the first plurality of slots engaged by the first latch is a second slot of the first plurality of slots of the upper half and the respective one slot of the second plurality of slots engaged by the second latch is a second slot of the second plurality of slots of the upper half, the upper half and the lower half are separated by a second separation so that the opening has a second size to accommodate the plurality of line sets having at least the second size;
the first separation is greater than the second separation such that the first size is greater than the second size; and
the first slot engaged by the first latch is the lowest slot of the first plurality of slots and the first slot engaged by the second latch is the lowest slot of the second plurality of slots.

15. The system of claim 1, wherein the tab extends beyond and below the lowest slot of the first plurality of slots of the first sidewall wherein when the tab fits around the first and second sidewalk of the lower half, the tab is spaced from and parallel to the first sidewall of the lower half.

16. The system of claim 1, wherein the plurality of line sets comprises at least one of lines run from a cooling system to a blower unit, electrical cables, and condensation lines.

17. A system, comprising:
a duct with an adjustable opening to accommodate a range of respective sizes of line sets for air conditioning systems, the duct comprising:
an upper half having a first sidewall, a second sidewall, a top surface from the first and second sidewalls, a first plurality of receiving members formed along an inner surface of the first sidewall and which extend inward in the upper half and a second plurality of receiving members formed along an inner surface of the second sidewall and which extend inward in the upper half wherein the first plurality of receiving members comprises at least a lowest receiving member and the second plurality of receiving members comprises at least a lowest receiving member;
a tab being an extension of the first sidewall beyond the lowest receiving member of the first plurality of receiving members; and
a lower half to store therein a plurality of line sets, the lower half including a first sidewall, a second sidewall and a bottom portion from the first sidewall and the second sidewall of the lower half, a first engaging member extending angularly outward from the first sidewall of the lower half, a second engaging member extending angularly outward from the second sidewall of the lower half, said first engaging member selectively engages a respective one receiving member of the first plurality of receiving members and said second engaging member selectively engages a respective one receiving member of the second plurality of receiving members to secure the upper half and the lower half together with the adjustable opening of an adjustable size therebetween to accommodate the plurality of line sets,
wherein the first and second sidewalls of the upper half including the tab fit around the first and second sidewalls of the lower half including the first engaging member and the second engaging member such that the first and second sidewalls of the lower half when moved upward into the upper half between the first and second sidewalls of the upper half to selectively engage the first engaging member to the respective one receiving member of the first plurality of receiving members and selectively engage the second engaging member to the respective one receiving member of the second plurality of receiving members,
wherein the respective one receiving member engaged by the first engaging member and the respective one receiving member engaged by the second engaging member are selected to adjust the adjustable size of the opening to correspond to a respective size of the plurality of line sets to be covered by of the system, wherein the tab when pulled in a direction away from the lower half separates the upper half and the lower half;

wherein each receiving member of the first plurality of receiving members is defined between a pair of adjacent teeth that extend inward and upwardly from the inner sidewall at an angle wherein the angle is in a range of 30-60 degrees with respect to the first sidewall of the upper half; and each receiving member of the second plurality of receiving members is defined between a pair of adjacent teeth that extend inward and upwardly from the inner sidewall at the angle with respect to the second sidewall of the upper half wherein the angle is in the range of 30-60 degrees with respect to the second sidewall of the upper half.

18. The system of claim 17, wherein the first plurality of receiving members extend along the first sidewall of the upper half over a longitudinal length of the upper half.

19. The system of claim 17, further comprising:

a second tab, the second tab being an extension of the second sidewall of the upper half beyond the lowest receiving member of the second plurality of receiving members; and the second tab separates the upper half and the lower half upon moving the second tab in an outward direction away from the lower half.

20. A method for covering a plurality of line sets having a plurality of respective sizes, said method comprising:

providing an upper half having a first sidewall, a second sidewall, a top surface from the first and second sidewalls, a first plurality of slots formed along an inner surface of the first sidewall and which extend inward in the upper half, each slot of the first plurality of slots is defined between a pair of adjacent teeth that extend inward from the inner sidewall at an angle wherein the angle is an obtuse angle with respect to the first sidewall of upper half, and a second plurality of slots formed along an inner surface of the second sidewall and which extend inward in the upper half, each slot of the second plurality of slots is defined between a pair of adjacent teeth that extend inward from the inner sidewall at the angle with respect to the second sidewall of the upper half, wherein the first plurality of slots comprises at least a lowest slot and the second plurality of slots comprises at least a lowest slot and wherein the upper half includes a tab being an extension of the first sidewall beyond the lowest slot of the first plurality of slots;

providing a lower half to store therein the plurality of line sets, the lower half including a first sidewall, a second sidewall and a bottom portion from the first sidewall and the second sidewall of the lower half, a first latch extending angularly outward from the first sidewall of the lower half, a second latch extending angularly outward from the second sidewall of the lower half, said first latch selectively engages a respective one slot of the first plurality of slots and said second latch selectively engages a respective one slot of the second plurality of slots to secure the upper half and the lower half together with an opening of an adjustable size therebetween to accommodate the plurality of line sets;

fitting the first and second sidewalls of the upper half including the tab around the first and second sidewalls of the lower half including the first latch and the second latch;

pressing the upper half and the lower half together, such that the first and second sidewalls of the lower half is moved upward into the upper half between the first and second sidewalls of the upper half to selectively latch the first latch to the respective one slot of the first plurality of slots and selectively latch the second latch to the respective one slot of the second plurality of slots; and securing the upper half and the lower half together with the adjustable opening therebetween corresponding to a size of the plurality of line sets in the lower half, wherein the tab when pulled in a direction away from the lower half separates the upper half and the lower half.

* * * * *